US012163394B2

(12) United States Patent
Varkey et al.

(10) Patent No.: US 12,163,394 B2
(45) Date of Patent: *Dec. 10, 2024

(54) REDUCED TORQUE WIRELINE CABLE

(71) Applicant: Schlumberger Technology Corporation, Sugar Land, TX (US)

(72) Inventors: Joseph Varkey, Richmond, TX (US); Mathew Varghese, Abu Dhabi (AE); Sheng Chang, Sugar Land, TX (US); Tam Tran, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/724,450

(22) Filed: Dec. 23, 2019

(65) Prior Publication Data

US 2020/0123866 A1 Apr. 23, 2020

Related U.S. Application Data

(63) Continuation-in-part of application No. 16/362,738, filed on Mar. 25, 2019, now Pat. No. 10,605,022, and a continuation-in-part of application No. 16/113,705, filed on Aug. 27, 2018, said application No. 16/362,738 is a continuation of application No.

(Continued)

(51) Int. Cl.

| | |
|---|---|
| ***E21B 23/14*** | (2006.01) |
| ***D07B 1/14*** | (2006.01) |
| *H01B 7/04* | (2006.01) |

(52) U.S. Cl.

CPC .............. *E21B 23/14* (2013.01); *D07B 1/147* (2013.01); *H01B 7/046* (2013.01)

(58) Field of Classification Search

CPC ......... E21B 23/14; H01B 7/046; H01B 7/221; H01B 9/025; H01B 11/1041; D07B 1/147

See application file for complete search history.

(56) References Cited

U.S. PATENT DOCUMENTS

| | | |
|---|---|---|
| 1,948,439 A | 2/1934 | Budscheid |
| 1,973,091 A | 9/1934 | Miller |

(Continued)

FOREIGN PATENT DOCUMENTS

| | | |
|---|---|---|
| CN | 2755741 Y | 2/2006 |
| CN | 201327731 Y | 10/2009 |

(Continued)

OTHER PUBLICATIONS

Examination Report issued n the related CA application 2774775, dated Aug. 16, 2016, (3 pages).

(Continued)

*Primary Examiner* — Taras P Bemko
*Assistant Examiner* — Michael A Goodwin
(74) *Attorney, Agent, or Firm* — Ashley E. Brown

(57) ABSTRACT

A wireline cable includes an electrically conductive cable core for transmitting electrical power. The wireline cable further includes an inner layer of a plurality of first armor wires surrounding the cable core and an outer layer of a plurality of second armor wires surrounding the inner layer, wherein a diameter of the outer layer of the plurality of second armor wires is smaller than a diameter of the inner layer of the plurality of first armor wires.

18 Claims, 21 Drawing Sheets

Related U.S. Application Data

15/617,270, filed on Jun. 8, 2017, now Pat. No. 10,240,416, said application No. 16/113,705 is a continuation-in-part of application No. 15/214,703, filed on Jul. 20, 2016, now abandoned, said application No. 15/617,270 is a continuation of application No. 14/705,094, filed on May 6, 2015, now Pat. No. 9,677,359, which is a continuation of application No. 13/497,142, filed on May 9, 2012, now Pat. No. 9,027,657, said application No. 15/214,703 is a continuation of application No. 12/425,439, filed on Apr. 17, 2009, now Pat. No. 9,412,492.

(56) References Cited

U.S. PATENT DOCUMENTS

| | | | | |
|---|---|---|---|---|
| 1,995,071 | A | 3/1935 | Mackenzie | |
| 2,002,061 | A | 5/1935 | House | |
| 2,003,001 | A | 5/1935 | Leece | |
| 2,118,629 | A | 5/1938 | Waldron | |
| 2,576,227 | A | 11/1951 | Hutchins, Jr. | |
| 2,604,509 | A * | 7/1952 | Blanchard | D07B 1/147 174/108 |
| 3,115,542 | A | 12/1963 | Palandri | |
| 3,127,083 | A | 3/1964 | Guyer | |
| 3,217,083 | A | 11/1965 | Gore | |
| 3,259,675 | A | 7/1966 | Bowers | |
| 3,313,346 | A | 4/1967 | Cross | |
| 3,328,140 | A | 6/1967 | Warren | |
| 3,346,045 | A | 10/1967 | Knapp | |
| 3,482,034 | A | 12/1969 | Rhoades | |
| 3,490,125 | A | 1/1970 | Frieling, Jr. | |
| 3,554,284 | A | 1/1971 | Nystrom | |
| 3,567,879 | A | 3/1971 | Dueker | |
| 3,573,349 | A | 4/1971 | Bowers | |
| 3,634,607 | A | 1/1972 | Coleman | |
| 3,679,812 | A | 7/1972 | Owens | |
| 3,681,514 | A | 8/1972 | Rhoades | |
| 3,710,859 | A | 1/1973 | Hanes | |
| 3,758,704 | A | 9/1973 | Naud | |
| 3,766,307 | A | 10/1973 | Andrews, Jr. | |
| 4,016,942 | A | 4/1977 | Wallis, Jr. et al. | |
| 4,059,951 | A | 11/1977 | Roe | |
| 4,077,022 | A | 2/1978 | Pitts, Jr. | |
| 4,131,757 | A | 12/1978 | Felkel | |
| 4,131,758 | A | 12/1978 | Felkel | |
| 4,197,423 | A | 4/1980 | Fusen | |
| 4,250,351 | A | 2/1981 | Bridges | |
| 4,259,544 | A | 3/1981 | Litauer | |
| 4,281,716 | A | 8/1981 | Hall | |
| 4,292,588 | A | 9/1981 | Smith | |
| 4,409,431 | A | 10/1983 | Neuroth | |
| 4,486,252 | A | 12/1984 | Lloyd | |
| 4,522,464 | A | 6/1985 | Thompson et al. | |
| 4,523,804 | A | 6/1985 | Thompson | |
| 4,525,813 | A | 6/1985 | Burrage | |
| 4,547,774 | A | 10/1985 | Gould | |
| 4,577,693 | A | 3/1986 | Graser | |
| 4,606,604 | A | 8/1986 | Soodak | |
| 4,644,094 | A | 2/1987 | Hoffman | |
| 4,645,298 | A | 2/1987 | Gartside, III | |
| 4,673,041 | A | 6/1987 | Turner et al. | |
| 4,675,474 | A | 6/1987 | Neuroth | |
| 4,696,542 | A | 9/1987 | Thompson | |
| 4,722,589 | A | 2/1988 | Priaroggia | |
| 4,729,629 | A | 3/1988 | Saito et al. | |
| 4,743,711 | A | 5/1988 | Hoffman | |
| 4,762,180 | A | 8/1988 | Wybro et al. | |
| 4,767,182 | A | 8/1988 | Parfree | |
| 4,768,984 | A | 9/1988 | de Oliveira et al. | |
| 4,818,060 | A | 4/1989 | Arroyo | |
| 4,825,953 | A | 5/1989 | Wong et al. | |
| 4,830,113 | A | 5/1989 | Geyer | |
| 4,899,823 | A | 2/1990 | Cobb et al. | |
| 4,920,738 | A | 5/1990 | White | |
| 4,952,012 | A * | 8/1990 | Stamnitz | G02B 6/4416 385/101 |
| 4,979,795 | A | 12/1990 | Mascarenhas | |
| 4,986,360 | A | 1/1991 | Laky et al. | |
| 4,993,492 | A | 2/1991 | Cressey et al. | |
| 5,002,130 | A | 3/1991 | Laky | |
| 5,088,559 | A | 2/1992 | Taliaferro | |
| 5,125,061 | A | 6/1992 | Marlier et al. | |
| 5,125,062 | A | 6/1992 | Marlier et al. | |
| 5,150,443 | A | 9/1992 | Wijnberg | |
| 5,329,605 | A | 7/1994 | Wargotz | |
| 5,339,378 | A | 8/1994 | Simonds et al. | |
| 5,431,759 | A | 7/1995 | Neuroth | |
| 5,438,164 | A | 8/1995 | Green | |
| 5,495,547 | A | 2/1996 | Rafie et al. | |
| 5,751,879 | A | 5/1998 | Graham | |
| 5,778,981 | A | 7/1998 | Head | |
| 5,787,217 | A | 7/1998 | Traut et al. | |
| 5,857,523 | A | 1/1999 | Edwards | |
| 5,894,104 | A | 4/1999 | Hedberg | |
| 5,930,431 | A | 7/1999 | Lail et al. | |
| 6,015,013 | A | 1/2000 | Edwards et al. | |
| 6,030,255 | A | 2/2000 | Konishi et al. | |
| 6,053,252 | A | 4/2000 | Edwards | |
| 6,060,662 | A | 5/2000 | Rafie et al. | |
| 6,116,345 | A | 9/2000 | Fontana et al. | |
| 6,161,619 | A | 12/2000 | Head | |
| 6,182,765 | B1 | 2/2001 | Kilgore | |
| 6,195,487 | B1 | 2/2001 | Anderson et al. | |
| 6,211,467 | B1 | 4/2001 | Berelsman et al. | |
| 6,276,456 | B1 | 8/2001 | Head | |
| 6,334,015 | B2 | 12/2001 | Jamet | |
| 6,386,290 | B1 | 5/2002 | Headworth | |
| 6,389,204 | B1 | 5/2002 | Hurley | |
| 6,392,151 | B1 | 5/2002 | Rafie | |
| 6,403,889 | B1 | 6/2002 | Mehan et al. | |
| 6,442,304 | B1 | 8/2002 | Crawley et al. | |
| 6,484,806 | B2 | 11/2002 | Childers et al. | |
| 6,488,093 | B2 | 12/2002 | Moss | |
| 6,555,752 | B2 | 4/2003 | Dalrymple et al. | |
| 6,559,383 | B1 | 5/2003 | Martin | |
| 6,559,385 | B1 | 5/2003 | Johnson et al. | |
| 6,600,108 | B1 | 7/2003 | Mydur et al. | |
| 6,631,095 | B1 | 10/2003 | Bryant et al. | |
| 6,659,180 | B2 | 12/2003 | Moss | |
| 6,675,888 | B2 | 1/2004 | Schempf et al. | |
| 6,691,775 | B2 | 2/2004 | Headworth | |
| 6,745,840 | B2 | 6/2004 | Headworth | |
| 6,747,213 | B2 | 6/2004 | Bonicel | |
| 6,763,889 | B2 | 7/2004 | Rytlewski et al. | |
| 6,775,444 | B1 | 8/2004 | Hurley | |
| 6,776,195 | B2 | 8/2004 | Blasko et al. | |
| 6,807,988 | B2 | 10/2004 | Powell et al. | |
| 6,834,724 | B2 | 12/2004 | Headworth | |
| 6,843,321 | B2 | 1/2005 | Carlsen | |
| 6,919,512 | B2 | 7/2005 | Guven et al. | |
| 7,000,903 | B2 | 2/2006 | Piecyk et al. | |
| 7,116,283 | B2 | 10/2006 | Benson et al. | |
| 7,119,283 | B1 | 10/2006 | Varkey et al. | |
| 7,139,218 | B2 | 11/2006 | Hall et al. | |
| 7,170,007 | B2 | 1/2007 | Varkey et al. | |
| 7,188,406 | B2 | 3/2007 | Varkey et al. | |
| 7,235,743 | B2 | 6/2007 | Varkey | |
| 7,282,644 | B1 | 10/2007 | Alvey | |
| 7,288,721 | B2 | 10/2007 | Varkey et al. | |
| 7,326,854 | B2 | 2/2008 | Varkey | |
| 7,331,393 | B1 | 2/2008 | Hoel | |
| 7,402,753 | B2 | 7/2008 | Varkey et al. | |
| 7,462,781 | B2 | 12/2008 | Varkey et al. | |
| 7,465,876 | B2 | 12/2008 | Varkey | |
| 7,586,042 | B2 | 9/2009 | Varkey et al. | |
| 7,699,114 | B2 | 4/2010 | Ullah | |
| 7,700,880 | B2 | 4/2010 | Varkey et al. | |
| 7,719,283 | B2 | 5/2010 | Ishikawa et al. | |
| 7,730,936 | B2 | 6/2010 | Hernandez-Solis et al. | |
| 7,793,409 | B2 | 9/2010 | Varkey | |
| 7,798,234 | B2 | 9/2010 | Ju et al. | |
| 7,845,412 | B2 | 12/2010 | Sbordone et al. | |
| 8,011,435 | B2 | 9/2011 | Carossino et al. | |

(56) References Cited

U.S. PATENT DOCUMENTS

| | | | |
|---|---|---|---|
| 8,218,925 | B2 | 7/2012 | Bohler |
| 8,227,697 | B2 | 7/2012 | Varkey et al. |
| 8,387,701 | B2 | 3/2013 | Sbordone |
| 8,413,723 | B2 | 4/2013 | Varkey et al. |
| 8,807,225 | B2 | 8/2014 | Varkey et al. |
| 8,886,000 | B2 | 11/2014 | Register, III |
| 8,901,425 | B2 | 12/2014 | Varkey et al. |
| 8,929,702 | B2 | 1/2015 | Varkey |
| 8,960,271 | B2 | 2/2015 | Lahijani |
| 8,969,726 | B2 | 3/2015 | Varkey et al. |
| 9,024,189 | B2 | 5/2015 | Basak |
| 9,027,657 | B2 | 5/2015 | Varkey |
| 9,058,921 | B2 | 6/2015 | Congdon |
| 9,069,148 | B2 | 6/2015 | Herbst |
| 9,091,154 | B2 | 7/2015 | Weerasinghe |
| 9,188,756 | B2 | 11/2015 | Register, III |
| 9,335,503 | B2 | 5/2016 | Kachmar |
| 9,368,260 | B2 | 6/2016 | Varkey et al. |
| 9,412,492 | B2 | 8/2016 | Varkey et al. |
| 9,412,502 | B2 | 8/2016 | Magner |
| 9,691,523 | B2 | 6/2017 | Pourladian |
| 9,947,437 | B2 | 4/2018 | Li et al. |
| 10,001,613 | B2 | 6/2018 | Varkey |
| 10,049,789 | B2 | 8/2018 | Varkey |
| 10,087,717 | B2 | 10/2018 | Varkey |
| 10,215,939 | B1 | 2/2019 | Varkey |
| 10,268,015 | B2 | 4/2019 | Sato |
| 10,593,444 | B2 | 3/2020 | Schwartz |
| 10,612,947 | B2 | 4/2020 | Kishida |
| 11,268,329 | B2 | 3/2022 | Varkey |
| 11,387,014 | B2 | 7/2022 | Varkey et al. |
| 2003/0011489 | A1 | 1/2003 | Viswanathan |
| 2003/0163179 | A1 | 8/2003 | Hoglund et al. |
| 2004/0163822 | A1 | 8/2004 | Zhang et al. |
| 2004/0262027 | A1 | 12/2004 | Kaczmarski |
| 2005/0217844 | A1 | 10/2005 | Edwards et al. |
| 2005/0219063 | A1 | 10/2005 | Viswanathan et al. |
| 2006/0018611 | A1 | 1/2006 | Maida |
| 2006/0024842 | A1 | 2/2006 | Nylese |
| 2006/0045442 | A1 | 3/2006 | Varkey |
| 2006/0104579 | A1 | 5/2006 | Fitz |
| 2006/0151194 | A1 | 7/2006 | Varkey et al. |
| 2006/0187084 | A1 | 8/2006 | Hernandez-Marti et al. |
| 2006/0211286 | A1 | 9/2006 | Shuey |
| 2006/0221768 | A1 | 10/2006 | Hall et al. |
| 2006/0237217 | A1 | 10/2006 | Glew |
| 2006/0237218 | A1 | 10/2006 | Glew |
| 2006/0242824 | A1* | 11/2006 | Varkey .................. H01B 13/26 29/854 |
| 2007/0000682 | A1 | 1/2007 | Varkey et al. |
| 2007/0003780 | A1 | 1/2007 | Varkey et al. |
| 2007/0044991 | A1 | 3/2007 | Varkey |
| 2007/0059499 | A1 | 3/2007 | Yuasa et al. |
| 2007/0158095 | A1 | 7/2007 | Sridhar et al. |
| 2007/0196557 | A1 | 8/2007 | Weissman |
| 2008/0031578 | A1 | 2/2008 | Varkey |
| 2008/0083533 | A1 | 4/2008 | Malone et al. |
| 2008/0118209 | A1 | 5/2008 | Varkey |
| 2008/0156517 | A1 | 7/2008 | Varkey et al. |
| 2008/0190612 | A1* | 8/2008 | Buchanan ............. E21B 33/134 166/288 |
| 2008/0247717 | A1 | 10/2008 | Patlakh |
| 2008/0247718 | A1 | 10/2008 | Dowd |
| 2009/0034920 | A1 | 2/2009 | Dowd |
| 2009/0038149 | A1 | 2/2009 | Varkey |
| 2009/0046986 | A1 | 2/2009 | Maeda |
| 2009/0089998 | A1 | 4/2009 | Varkey |
| 2009/0194296 | A1 | 8/2009 | Gillan et al. |
| 2009/0194314 | A1 | 8/2009 | Varkey et al. |
| 2009/0283295 | A1* | 11/2009 | Varkey .................. D07B 1/162 174/105 R |
| 2010/0038112 | A1 | 2/2010 | Grether |
| 2010/0255186 | A1 | 10/2010 | Montes et al. |
| 2011/0075979 | A1 | 3/2011 | Ma |
| 2011/0232936 | A1 | 9/2011 | Magner |
| 2012/0125596 | A1 | 5/2012 | Homa |
| 2012/0222869 | A1 | 9/2012 | Varkey |
| 2013/0026314 | A1 | 1/2013 | Hu et al. |
| 2013/0227837 | A1 | 9/2013 | Varkey |
| 2014/0212609 | A1 | 7/2014 | Stratton |
| 2014/0352952 | A1 | 12/2014 | Varkey et al. |
| 2015/0233200 | A1 | 8/2015 | Varkey |
| 2015/0294762 | A1 | 10/2015 | Varkey |
| 2015/0294763 | A1 | 10/2015 | Varkey |
| 2015/0348677 | A1 | 12/2015 | Pourladian |
| 2016/0024902 | A1 | 1/2016 | Richter |
| 2016/0025945 | A1 | 1/2016 | Wanjau |
| 2016/0222736 | A1 | 8/2016 | Varkey |
| 2016/0329128 | A1 | 11/2016 | Varkey et al. |
| 2017/0268304 | A1 | 9/2017 | Varkey |
| 2017/0358385 | A1 | 12/2017 | Varkey |
| 2018/0025884 | A1 | 1/2018 | Flitsch |
| 2018/0073310 | A1 | 3/2018 | Varkey |
| 2018/0137953 | A1 | 5/2018 | Varkey |
| 2018/0252884 | A1 | 9/2018 | Quinn |
| 2018/0366240 | A1 | 12/2018 | Varkey |
| 2019/0064459 | A1 | 2/2019 | Varkey |
| 2019/0170955 | A1 | 6/2019 | Varkey |
| 2019/0279786 | A1 | 9/2019 | Varkey |
| 2020/0126691 | A1 | 4/2020 | Varkey |
| 2021/0055475 | A1 | 2/2021 | Varkey |

FOREIGN PATENT DOCUMENTS

| | | | |
|---|---|---|---|
| CN | 201413731 | Y | 2/2010 |
| CN | 101726814 | A | 6/2010 |
| CN | 101876733 | A | 11/2010 |
| CN | 103502864 | A | 1/2014 |
| CN | 103620465 | A | 3/2014 |
| CN | 205542137 | U | 8/2016 |
| CN | 106537210 | A | 3/2017 |
| CN | 106716209 | A | 5/2017 |
| CN | 208444062 | | 1/2019 |
| CN | 208767077 | | 4/2019 |
| EP | 0003104 | A1 | 7/1979 |
| EP | 471600 | A1 | 2/1992 |
| EP | 0996014 | A1 | 4/2000 |
| EP | 1216342 | A1 | 6/2002 |
| EP | 2039878 | A1 | 3/2009 |
| EP | 3108098 | A1 | 12/2016 |
| EP | 3250785 | A1 | 12/2017 |
| FR | 2767861 | A1 | 3/1999 |
| GB | 2234772 | A | 2/1991 |
| JP | 54007186 | A | 1/1979 |
| JP | H0195834 | A | 4/1989 |
| JP | 2216710 | A | 8/1990 |
| JP | H08508829 | A | 9/1996 |
| JP | H10104482 | A | 4/1998 |
| JP | H10170778 | A | 6/1998 |
| JP | 2002243999 | A | 8/2002 |
| JP | 2003151375 | A | 5/2003 |
| JP | 2017134267 | A | 8/2017 |
| KR | 0137668 | Y1 | 6/1998 |
| KR | 20000046916 | A | 12/1998 |
| KR | 20120026938 | A | 3/2012 |
| WO | 9948111 | A1 | 9/1999 |
| WO | 0125593 | A1 | 4/2001 |
| WO | 02071178 | A2 | 9/2002 |
| WO | 2006003362 | A1 | 1/2006 |
| WO | 2006027553 | A1 | 3/2006 |
| WO | 2006088372 | A1 | 8/2006 |
| WO | 2007034242 | A1 | 3/2007 |
| WO | 2008132637 | A1 | 11/2008 |
| WO | 2011037974 | A2 | 3/2011 |
| WO | 2020264494 | A1 | 12/2020 |
| WO | 2020264498 | A1 | 12/2020 |
| WO | 2022261390 | A1 | 6/2021 |

OTHER PUBLICATIONS

Lebedev, et al., "The breakdown Strength of two-layer dlielectrics", High Voltage Engineering, 1999. Eleventh International Symposium, Conf. Publ. No. 467, vol. 4, Aug. 22-27, 1999, pp. 304-307.

(56) References Cited

OTHER PUBLICATIONS

Salama, et al., "Instructional design of multi-layer insulation of power cabels". Power Systems, IEEE Transations, vol. 7, Issue 1, Feb. 1992, pp. 377-382.
International Search Report and Written Opinion issued in the related PCT application PCT/US2010/049783, dated May 9, 2011 (7 pages).
International Preliminary Report on Patentability issued in the related PCT application PCT/US2010/049783, dated Mar. 22, 2012 (5 pages).
Examination Report issued in the related AU application 2010298356, dated Oct. 19, 2015, (3 pages).
Office Action issued in the related MX application MX/a/2012/003397, dated Jun. 30, 2015 (5 pages).
International Search Report and Written Opinion issued in the related PCT application PCT/US2010/031218, dated Nov. 17, 2010 (6 pages).
International Preliminary Report on Patentability issued in the related PCT application PCT/US2010/031218, dated Oct. 18, 2011 (4 pages).
Examination Report issued in the related AU application 2010236397, dated Apr. 22, 2015, (15 pages).
Extended Search Report issued in the related EP Application 10765176.2, dated Mar. 23, 2015 (7 pages).
Office action issued in the related EP Application 10765176.2, dated Nov. 24, 2017 (6 pages).
Extended European Search Report issued in the related EP Application 117933206.1, dated Nov. 28, 2014 (11 pages).
International Search Report and Written Opinion issued in the related PCT application PCT/US2011/039879, dated Jan. 16, 2012 (9 pages).
International Preliminary Report on Patentability issued in the related PCT application PCT/US2011/039879, dated Dec. 20, 2012 (8 pages).
Office Action issued in the related MX application MX/a/2012/013746, dated Aug. 23, 2013, (4 pages).
EP Communication Article 94-3 issued in the related EP Application 117933206.1, dated Dec. 6, 2016 (8 pages).
Examination Report issued in the related CA application 2799642, dated Mar. 13, 2017 (4 pages).
Examination Report issued in the related AU Application 2011236038, dated Jul. 28, 2015 (3 pages).
Office Action issued in the related MX application MX/a/2011/010863, dated Jan. 29, 2014, (8 pages).
Examination Report issued in the related CA application 2755231, dated Aug. 1, 2017 (5 pages).
Office Action issued in the related U.S. Appl. No. 16/113,705 dated Sep. 11, 2019 (32 pages).
Office Action issued in the related Brazil Patent Application No. PI1011343.6 dated Oct. 30, 2019, 6 pages with English translation.
Office Action issued in the related U.S. Appl. No. 16/113,705 dated Sep. 29, 2020, 13 pages.
First Examination report issued in Saudi Arabia patent application 120420323 on Feb. 2, 2022. (6 pages with translation).
Office Action received in NO application 20073677, dated Oct. 15, 2015 (6 pages with translation).
Examination Report issued in AU Application 2006205539, dated May 24, 2010 (2 pages).
Examination Report issued in CA Application 2594393, dated Apr. 12, 2011 (4 pages).
Office Action issued in the EP Application 06701794.7, dated Dec. 13, 2007 (2 pages).
Examination Report issued in IN Application 3079/CHENP/2007, dated May 24, 2012 (1 page).
Second Exam Report issued in Saudi Arabian Patent Application 120420323 dated Jun. 30, 2022, 14 pages with English translation.
First Office Action issued in Chinese Patent Application 201907963934 dated May 23, 2022, 13 pages with English translation.
Office Action issued in Mexico Patent Application No. MX/a/2019/010220 dated Apr. 13, 2023, 7 pages.
International Search Report and Written Opinion issued in International Patent application PCT/US2020/040118 on Oct. 15, 2020, 10 pages.
International Preliminary Report on Patentability issued in International Patent application PCT/US2020/040118, dated Jan. 6, 2022, 7 pages.
International Search Report and Written Opinion issued in International Patent application PCT/US2020/040123 on Oct. 15, 2020, 10 pages.
International Preliminary Report on Patentability issued in International Patent application PCT/US2020/040123, dated Jan. 6, 2022, 7 pages.
Exam Report issued in United Kingdom Patent Application No. GB2118164.9 dated Oct. 27, 2022, 2 pages.
Office Action issued in U.S. Appl. No. 17/621,094 dated Jan. 27, 2023, 10 pages.
Office Action issued in U.S. Appl. No. 17/621,094 dated May 15, 2023, 10 pages.
Office Action issued in U.S. Appl. No. 17/621,094 dated Nov. 9, 2023, 11 pages.
First Office Action issued in China Patent Application No. 2020800475714 dated Nov. 28, 2023, 23 pages with English translation.
First Office Action issued in China Patent Application No. 2020800460615 dated Jan. 4, 2024, 20 pages with English translation.
Examination Report under section 18(3) issued in United Kingdom Patent Application No. GB2118161.5 dated Apr. 19, 2024, 2 pages.
Office Action issued in U.S. Appl. No. 17/621,094 dated Apr. 26, 2024, 16 pages.
International Search Report and Written Opinion issued in International Patent application PCT/US2022/032932 on Oct. 4, 2022, 10 pages.
Nowak, Gerhard, "Computer design of electromechanical cables for ocean applications," in Proceedings of Tenth Annual Marine Technology Society Conference, Washington, DC, 1974, pp. 293-305.
Office Action issued in U.S. Patent Application No. 17/621, 144 dated Jul. 2, 2024, 10 pages.
Office Action issued in U.S. Appl. No. 17/806,278 dated Jun. 5, 2024, 24 pages.
SA First Examination Report; Application No. 523451782; Dated Aug. 29, 2024; 8 pages.
Final Office Action issued in U.S. Appl. No. 17/806,278 dated Aug. 7, 2024, 22 pages.

* cited by examiner

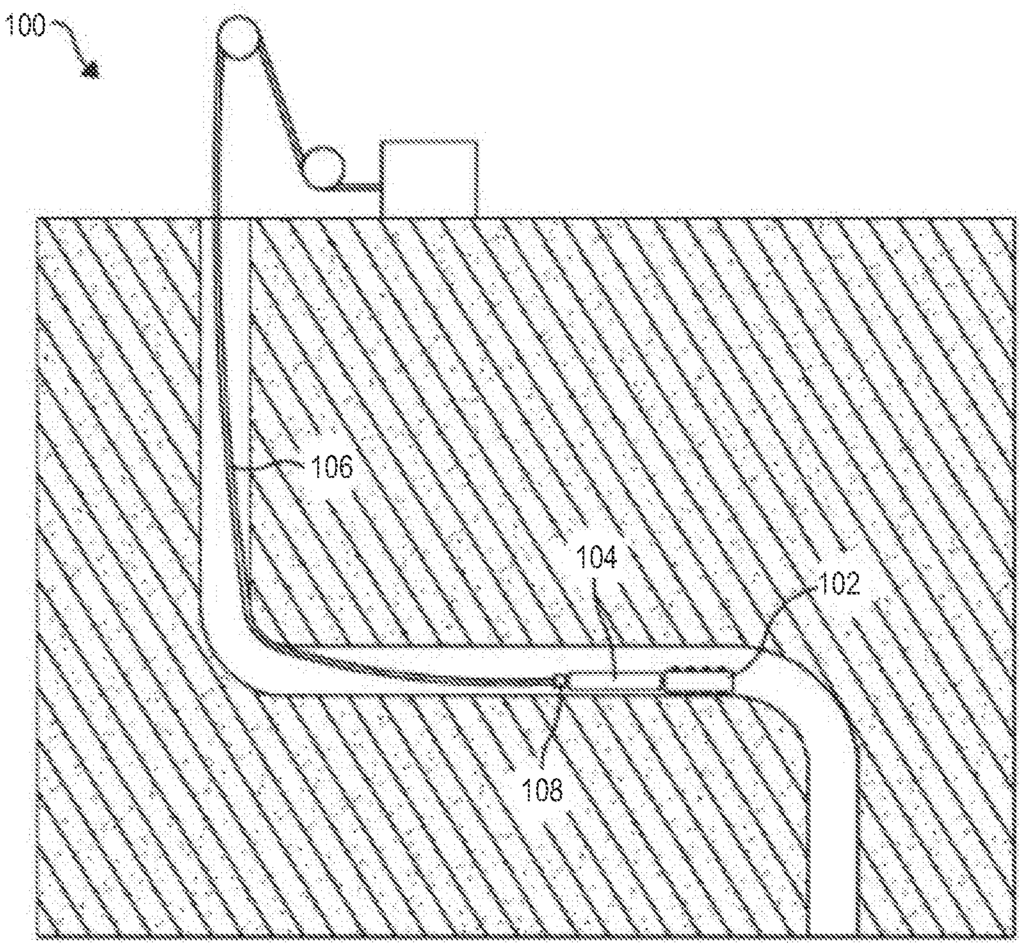
*FIG. 1*
(PRIORART)

REDUCED TORQUE WIRELINE CABLE

CROSS-REFERENCE TO RELATED APPLICATIONS

This application is a continuation-in-part of U.S. patent application Ser. No. 16/362,738, entitled "WIRELINE CABLE FOR USE WITH DOWNHOLE TRACTOR ASSEMBLIES," filed Mar. 25, 2019, which is a continuation of U.S. patent application Ser. No. 15/617,270, entitled "WIRELINE CABLE FOR USE WITH DOWNHOLE TRACTOR ASSEMBLIES," filed on Jun. 8, 2017, which is a continuation of U.S. patent application Ser. No. 14/705,094, entitled "WIRELINE CABLE FOR USE WITH DOWNHOLE TRACTOR ASSEMBLIES," filed on May 6, 2015, which is a continuation of U.S. patent application Ser. No. 13/497,142, entitled "WIRELINE CABLE FOR USE WITH DOWNHOLE TRACTOR ASSEMBLIES," filed on May 9, 2012, filed on Sep. 22, 2010 and this application is a continuation-in-part of U.S. patent application Ser. No. 16/113,705, entitled "TORQUE-BALANCED, GAS-SEALED WIRELINE CABLES," filed on Aug. 27, 2018, which is a continuation-in-part of U.S. patent application Ser. No. 15/214,703, entitled "TORQUE-BALANCED, GAS-SEALED WIRELINE CABLES," filed on Jul. 20, 2016, which is a continuation of U.S. patent application Ser. No. 12/425,439, entitled "TORQUE-BALANCED, GAS-SEALED WIRELINE CABLES," filed on Apr. 17, 2009, and which are incorporated by reference herein in their entireties for all purposes.

FIELD

The present disclosure relates generally to oilfield cables, and, in particular, to wireline cables, and methods of using and making wireline cables.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Deviated wells or wellbores often include extensive horizontal sections in addition to vertical sections. During oilfield operations, it can be particularly difficult to advance tool strings and cables along these horizontal sections. While tool strings descend by gravity in vertical well sections, tractor devices, which are attached to the tool strings are used to perform this task in the horizontal sections. Torque imbalances in wireline cables results in cable stretch, cable core deformation, and significant reductions in cable strength.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a wireline cable includes an electrically conductive cable core for transmitting electrical power. In the embodiment, the wireline cable also includes an inner layer of a plurality of first armor wires surrounding the cable core and an outer layer of a plurality of second armor wires surrounding the inner layer. In the embodiment, the diameter of the outer layer of the plurality of second armor wires is smaller than a diameter of the inner layer of the plurality of first armor wires.

In another embodiment, a wireline cable includes an electrically conductive cable core for transmitting electrical power and an inner layer of a plurality of first armor wires surrounding the cable core. In the embodiment, the wireline cable also includes an outer layer of a plurality of second armor wires surrounding the inner layer. In the embodiment, a coverage of the outer layer of the plurality of second armor wires over the inner layer of the plurality of first armor wires is between 50 and 96 percent. In the embodiment, the wireline cable also includes a jacket surrounding the inner layer of the plurality of first armor wires and the outer layer of the plurality of second armor wires, wherein the jacket is formed of an insulating material.

In a further embodiment, a method for use of a wireline cable includes providing the wireline cable. In the embodiment, the wireline cable includes an electrically conductive cable core for transmitting electrical power. In the embodiment, the wireline cable also includes an inner layer of a plurality of first armor wires surrounding the cable core and an outer layer of a plurality of second armor wires surrounding the inner layer. In the embodiment, a diameter of the outer layer of the plurality of second armor wires is at least 0.005 inches smaller than a diameter of the inner layer of the plurality of first armor wires. In the embodiment, the method also includes attaching a tractor to the wireline cable and introducing the tractor and the wireline cable into a wellbore.

BRIEF DESCRIPTION OF THE DRAWINGS

The present disclosure may be understood form the following detailed description when read with the accompanying figures. It is emphasized that, in accordance with the standard practice in the industry, various features may not be drawn to scale. In fact, the dimensions of the various features may be arbitrarily increased or reduced for clarity of discussion.

FIG. 1 illustrates a schematic representation of a downhole tractor assembly;

DETAILED DESCRIPTION OF SPECIFIC EMBODIMENTS

Figure 2:
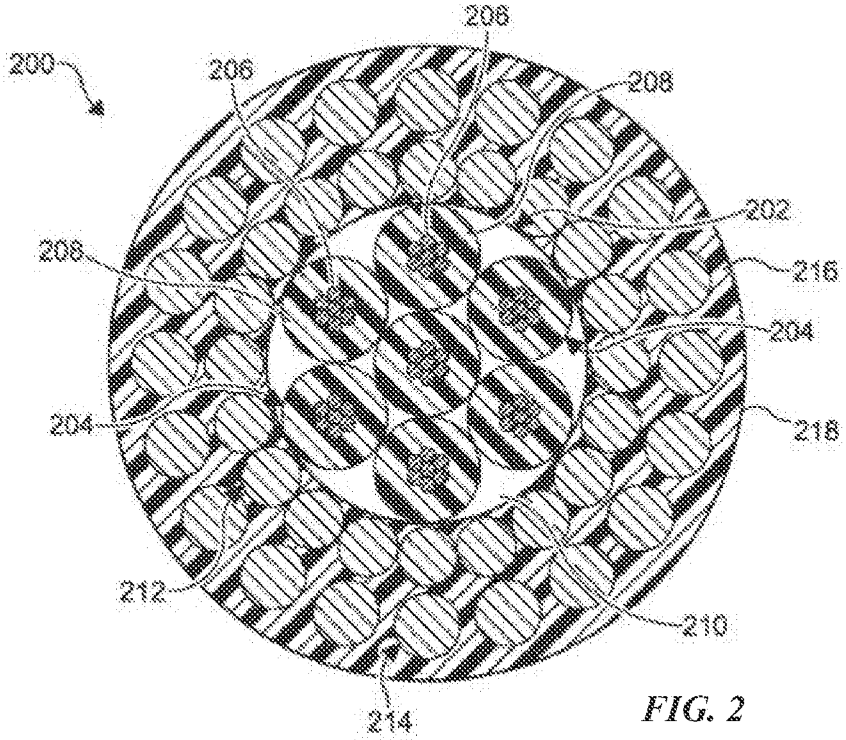
FIG. 2 illustrates a radial cross-sectional view of an example embodiment of a wireline cable.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

FIG. 1 illustrates a downhole tractor assembly 100 including a tractor 102 coupled to a tool string 104 and a cable 106 coupled to the tool string 104 opposite the tractor 102. In operation the tractor 102 pulls the tool string 104 and the cable 106 along a horizontal well section, while a swivel connection 108 coupled between the tool string 104 and the cable 106 minimizes a rotation of the cable 106 caused by a rotation of the tractor 102 and tool string 104.

Referring to FIG. 2, there is illustrated a torque balanced cable 200 for tractor operations according to an example embodiment of the present disclosure. As shown, the cable 200 includes a core 202 having a plurality of conductors 204. As a non-limiting example, each of the conductors 204 is formed from a plurality of conductive strands 206 disposed adjacent each other with an insulator 208 disposed therearound. As a further non-limiting example, the core 202 includes seven distinctly insulated conductors 204 disposed in a hepta cable configuration. However, any number of conductors 204 can be used in any configuration, as desired. In certain embodiments an interstitial void 210 formed between adjacent insulators 208 is filled with a semi-conductive (or non-conductive) filler (e.g. filler strands, polymer insulator filler).

The core 202 is surrounded by an inner layer of armor wires 212 (e.g. high modulus steel strength members) which is surrounded by an outer layer of armor wires 214. The armor wires 212 and 214 may be alloy armor wires. As a non-limiting example the layers 212, 214 are contra helically wound with each other. As shown, a coverage of the circumference of the outer layer 214 over the inner layer 212 is reduced from the 98% coverage found in conventional wireline cables to a percentage coverage that matches a torque created by the inner layer 212. As a non-limiting example the coverage of the outer layer 214 over the inner layer is between about 60% to about 88%. As another non-limiting example, the coverage of the outer layer 214 over the inner layer is between about 50% to about 96%. The reduction in the coverage allows the cable 200 to achieve torque balance and advantageously minimizes a weight of the cable 200. An interstitial void created in the outer layer 214 (e.g. between adjacent ones of the armor wires of the outer layer 214) is filled with a polymer as part of a jacket 216. In the embodiment shown, the jacket 216 encapsulates at least each of the layers 212, 214. As a non-limiting example, that jacket 216 includes a substantially smooth outer surface 218 (i.e. exterior surface) to minimize a friction coefficient thereof. It is understood that various polymers and other materials can be used to form the jacket 216. As a further non-limiting example, the smooth outer jacket 216 is bonded from the core 202 to the outer surface 218. In certain embodiments, the coefficient of friction of a material forming the jacket 216 is lower than a coefficient of friction of a material forming the interstices or insterstitial voids of the layers 212, 214. However, any materials having any coefficient of friction can be used.

In operation, the cable 200 is coupled to a tractor in a configuration known in the art. The cable 200 is introduced into the wellbore, wherein a torque on the cable 200 is substantially balanced and a friction between the cable 200 and the wellbore is minimized by the smooth outer surface 218 of the jacket 216. It is understood that various tool strings, such as the tool string 104, can be attached or coupled to the cable 200 and the tractor, such as the tractor 102, to perform various well service operations known in the art including, but not limited to, a logging operation, a mechanical service operation, or the like.

Figure 3:
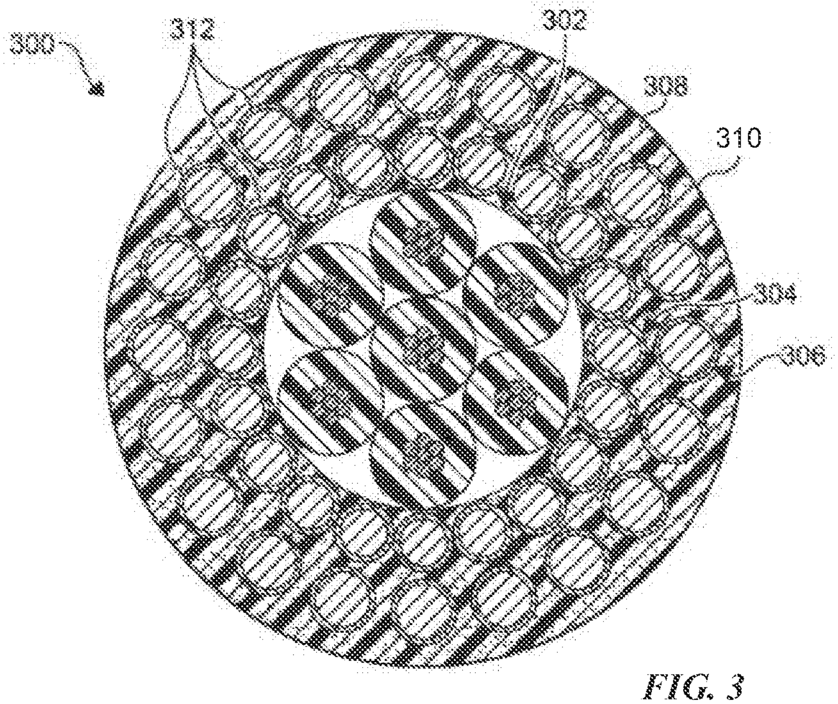
FIG. 3 illustrates a radial cross-sectional view of another embodiment of a wireline cable.

FIG. 3 illustrates a torque balanced cable 300 for tractor operations according to another embodiment of the present disclosure similar to the cable 200, except as described below. As shown, the cable 300 includes a core 302, an inner layer of armor wires 304, an outer layer of armor wires 306, and a polymeric jacket 308. As a non-limiting example, the jacket 308 is formed from a fiber reinforced polymer that encapsulates each of the layers 304, 306. As a non-limiting example, the jacket 308 includes a smooth outer surface 310 to reduce a frictional coefficient thereof. It is understood that various polymers and other materials can be used to form the jacket 308.

An outer surface of each of the layers 304, 306 includes a suitable metallic coating 312 or suitable polymer coating to bond to the polymeric jacket 308. Therefore, the polymeric jacket 308 becomes a composite in which the layers 304, 306 (e.g. high modulus steel strength members) are embedded and bonded in a continuous matrix of polymer from the core 302 to the outer surface 310 of the jacket 308. It is understood that the bonding of the layers 304, 306 to the jacket 308 minimizes stripping of the jacket 308.

Figure 4:
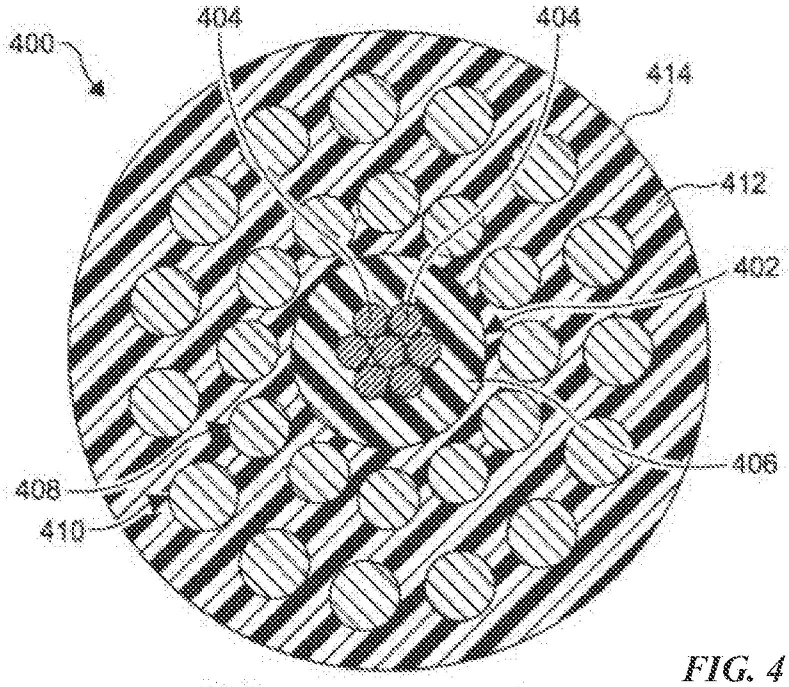
FIG. 4 illustrates a radial cross-sectional view of another embodiment of a wireline cable.

FIG. 4 illustrates a torque balanced cable 400 for tractor operations according to another embodiment of the present disclosure similar to the cable 200, except as described below. As shown, the cable 400 includes a core 402 having a plurality of conductive strands 404 embedded in a polymeric insulator 406. It is understood that various materials can be used to form the conductive strands 404 and the insulator 406.

The core 402 is surrounded by an inner layer of armor wires 408 which is surrounded by an outer layer of alloy armor wires 410. An interstitial void created in the outer layer 410 (e.g. between adjacent ones of the armor wires of the outer layer 410) is filled with a polymer as part of a jacket 412. In the embodiment shown, the jacket 412 encapsulates at least each of the layers 408, 410. As a non-limiting example, the jacket 412 includes a substantially smooth outer surface 414 to minimize a friction coefficient thereof. It is understood that various polymers and other materials can be used to form the jacket 412. As a further non-limiting example, the jacket 412 is bonded to the insulator 406 disposed in the core 402. In certain embodiments, the coefficient of friction of a material forming the jacket 412 is lower than a coefficient of friction of a material forming the insulator 406. However, any materials having any coefficient of friction can be used.

Figure 5:
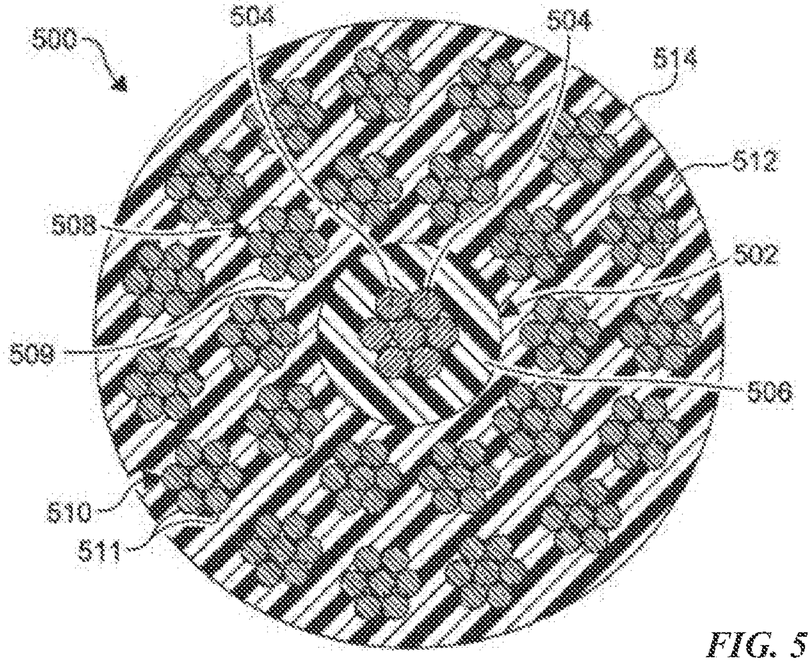
FIG. 5 illustrates a radial cross-sectional view of another embodiment of a wireline cable.

FIG. 5 illustrates a torque balanced cable 500 for tractor operations according to another embodiment of the present disclosure similar to the cable 400, except as described below. As shown, the cable 500 includes a core 502 having a plurality of conductive strands 504 embedded in a polymeric insulator 506. It is understood that various materials can be used to form the conductive strands 504 and the insulator 506.

The core 502 is surrounded by an inner layer of armor wires 508, wherein each of the armor wires of the inner layer 508 is formed from a plurality of metallic strands 509. The inner layer 508 is surrounded by an outer layer of armor wires 510, wherein each of the armor wires of the outer layer 510 is formed from a plurality of metallic strands 511. As a non-limiting example the layers 508, 510 are contra helically wound with each other. An interstitial void created in the outer layer 510 (e.g. between adjacent ones of the armor wires of the outer layer 510) is filled with a polymer as part of a jacket 512. In the embodiment shown, the jacket 512 encapsulates at least each of the layers 508, 510. As a non-limiting example, that jacket 512 includes a substantially smooth outer surface 514 to minimize a friction coefficient thereof.

Figure 6:
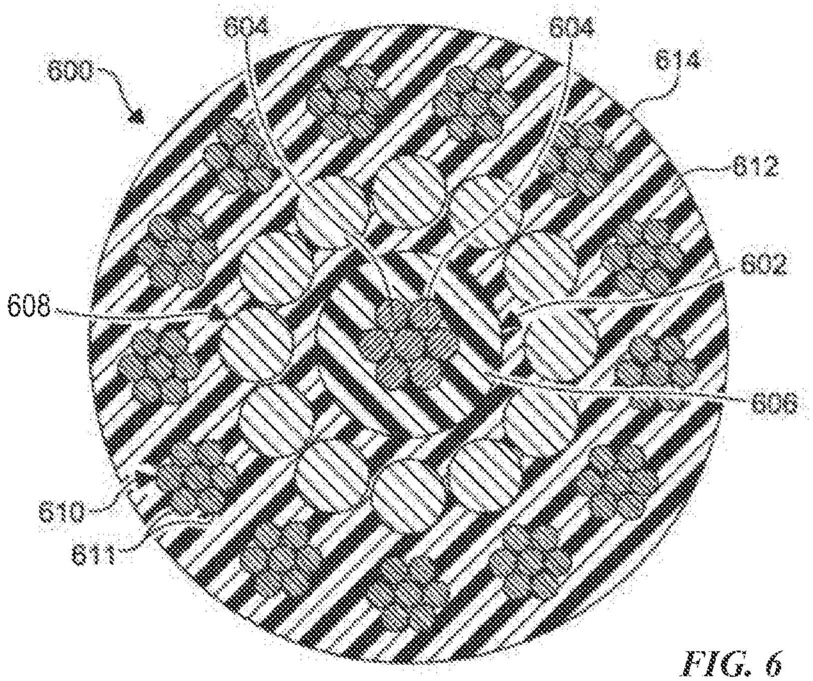
FIG. 6 illustrates a radial cross-sectional view of another embodiment of a wireline cable.

FIG. 6 illustrates a torque balanced cable 600 for tractor operations according to another embodiment of the present disclosure similar to the cable 400, except as described below. As shown, the cable 600 includes a core 602 having a plurality of conductive strands 604 embedded in a polymeric insulator 606. It is understood that various materials can be used to form the conductive strands 604 and the insulator 606.

The core 602 is surrounded by an inner layer of armor wires 608, wherein each of the armor wires of the inner layer is formed from a single strand. The inner layer 608 is surrounded by an outer layer of armor wires 610, wherein each of the armor wires of the outer layer 610 is formed from a plurality of metallic strands 611. As a non-limiting example the layers 608, 610 are contra helically wound with each other. An interstitial void created in the outer layer 610 (e.g. between adjacent ones of the armor wires of the outer layer 610) is filled with a polymer as part of a jacket 612. In the embodiment shown, the jacket 612 encapsulates at least each of the layers 608, 610. As a non-limiting example, that jacket 612 includes a substantially smooth outer surface 614 to minimize a friction coefficient thereof.

Figure 7:
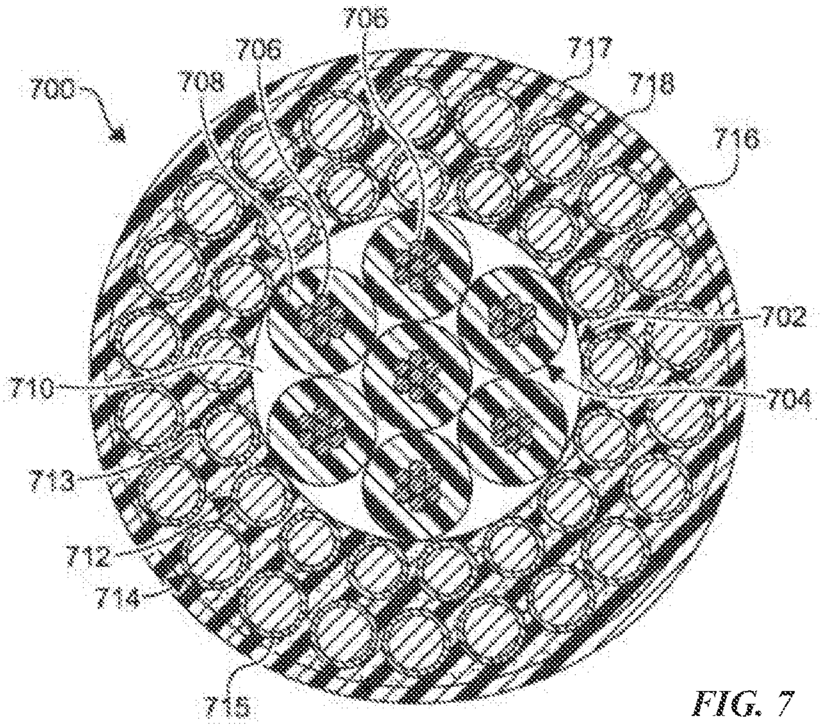
FIG. 7 illustrates a radial cross-sectional view of another embodiment of a wireline cable.

FIG. 7 illustrates a torque balanced cable 700 for tractor operations according to another embodiment of the present disclosure similar to the cable 300, except as described below. As shown, the cable 700 includes a core 702 having a plurality of conductors 704. As a non-limiting example, each of the conductors 704 is formed from a plurality of conductive strands 706 with an insulator 708 disposed therearound. In certain embodiments an interstitial void 710 formed between adjacent insulators 708 is filled with semi-conductive or non-conductive filler (e.g. filler strands, insulated filler).

The core 702 is surrounded by an inner layer of armor wires 712 which is surrounded by an outer layer of armor wires 714. As a non-limiting example the layers 712, 714 are contra helically wound with each other. An outer surface of each of the layers 712, 714 includes a suitable metallic coating 713, 715 or suitable polymer coating to bond to a polymeric jacket 716 encapsulating each of the layers 712, 714. As a non-limiting example, at least a portion of the jacket 716 is formed from a fiber reinforced polymer.

In the embodiment shown, an outer circumferential portion 717 of the jacket 716 (e.g. 1 to 15 millimeters) is formed from polymeric material without reinforcement fibers disposed therein to provide a smooth outer surface 718. As a non-limiting example, the outer circumferential portion 717 may be formed from virgin polymeric material or polymer materials amended with other additives to minimize a coefficient of friction. As a further non-limiting example, a non-fiber reinforced material is disposed on the jacket 716 and chemically bonded thereto.

Figure 8:
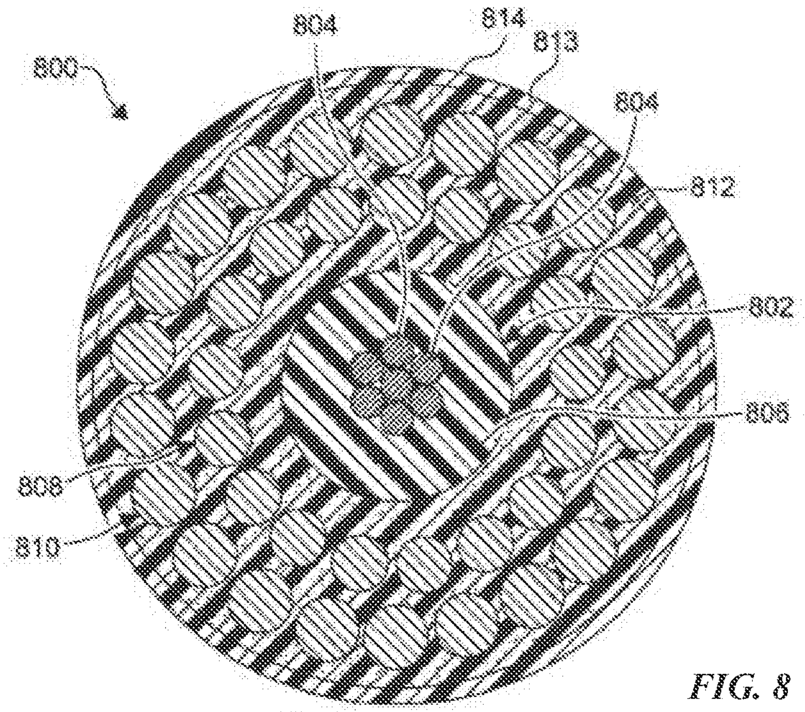
FIG. 8 illustrates a radial cross-sectional view of another embodiment of a wireline cable.

FIG. 8 illustrates a torque balanced cable 800 for tractor operations according to another embodiment of the present disclosure similar to the cable 400, except as described below. As shown, the cable 800 includes a core 802 having a plurality of conductive strands 804 embedded in a polymeric insulator 806. It is understood that various materials can be used to form the conductive strands 804 and the insulator 806.

The core 802 is surrounded by an inner layer of armor wires 808. The inner layer 808 is surrounded by an outer layer of armor wires 810. As a non-limiting example the layers 808, 810 are contra helically wound with each other. An interstitial void created in the outer layer 810 (e.g. between adjacent ones of the armor wires of the outer layer 810) is filled with a polymer as part of a jacket 812. As a non-limiting example, at least a portion of the jacket 812 is formed from a fiber reinforced polymer. As a further non-limiting example, the jacket 812 encapsulates at least each of the layers 808, 810.

In the embodiment shown, an outer circumferential portion 813 of the jacket 812 (e.g. 1 to 15 millimeters) is formed from polymeric material without reinforcement fibers disposed therein to provide a smooth outer surface 814. As a non-limiting example, the outer circumferential portion 813 may be formed from virgin polymeric material or polymer materials amended with other additives to minimize a coefficient of friction. As a further non-limiting example, a non-fiber reinforced material is disposed on the jacket 812 and chemically bonded thereto.

Figure 9:
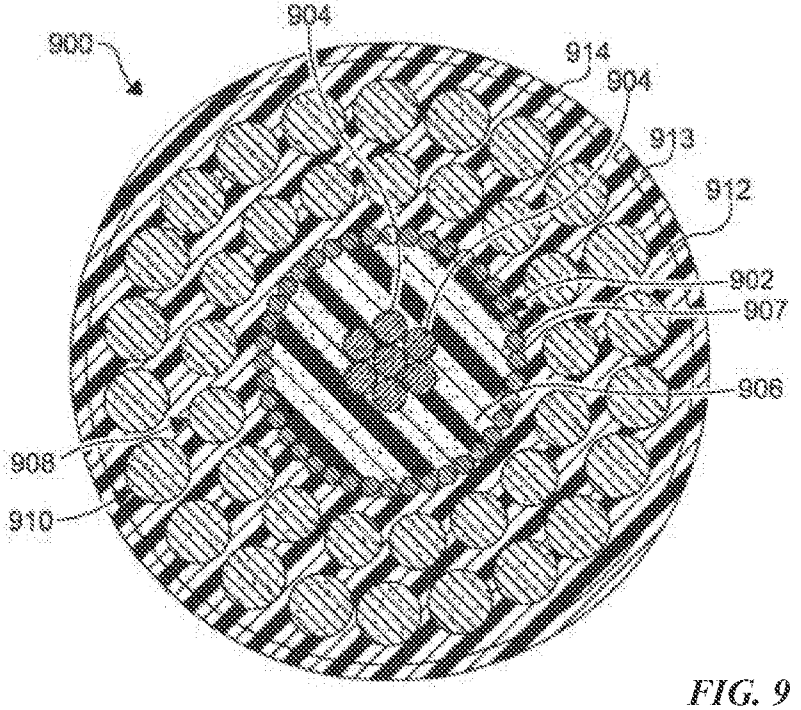
FIG. 9 illustrates a radial cross-sectional view of another embodiment of a wireline cable.

FIG. 9 illustrates a torque balanced cable 900 for tractor operations according to another embodiment of the present disclosure similar to the cable 400, except as described below. As shown, the cable 900 includes a core 902 having a plurality of conductive strands 904 embedded in a polymeric insulator 906. It is understood that various materials can be used to form the conductive strands 904 and the insulator 906. The core 902 includes an annular array of shielding wires 907 circumferentially disposed adjacent a periphery of the core 902, similar to conventional coaxial cable configurations in the art. As a non-limiting example, the shielding wires 907 are formed from copper. However, other conductors can be used.

The core 902 and the shielding wires 907 are surrounded by an inner layer of armor wires 908. The inner layer 908 is surrounded by an outer layer of armor wires 910. As a non-limiting example the layers 908, 910 are contra helically wound with each other. An interstitial void created in the outer layer 910 (e.g. between adjacent ones of the armor wires of the outer layer 910) is filled with a polymer as part of a jacket 912. As a non-limiting example, at least a portion of the jacket 912 is formed from a fiber reinforced polymer. In the embodiment shown, the jacket 912 encapsulates at least each of the layers 908, 910.

In the embodiment shown, an outer circumferential portion 913 of the jacket 912 (e.g. 1 to 15 millimeters) is formed from polymeric material without reinforcement fibers disposed therein to provide a smooth outer surface 914. As a non-limiting example, the outer circumferential portion 913 may be formed from virgin polymeric material or polymer materials amended with other additives to minimize a coefficient of friction. As a further non-limiting example, a non-fiber reinforced material is disposed on the jacket 912 and chemically bonded thereto.

Figure 10:
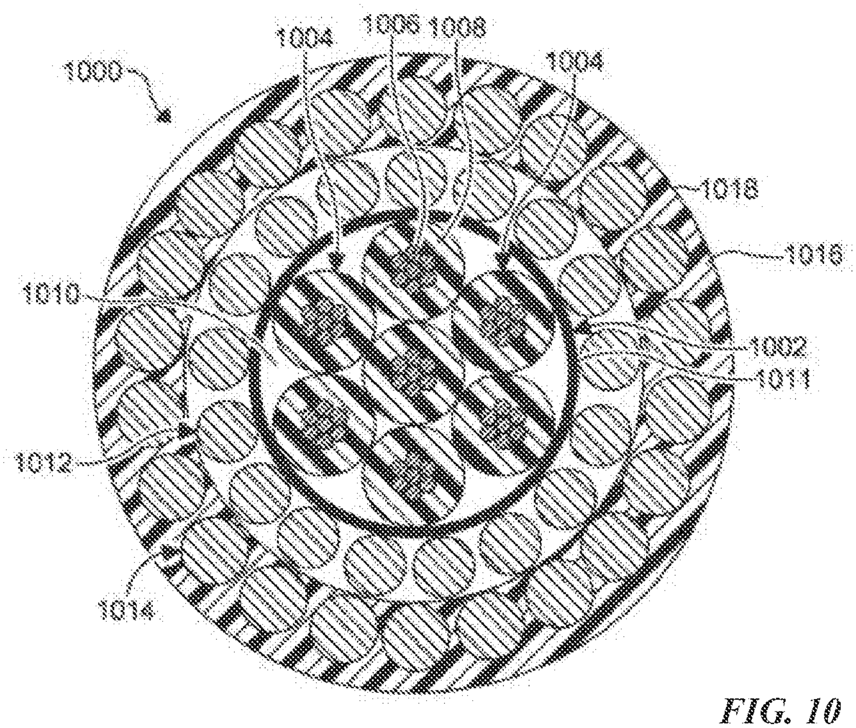
FIG. 10 illustrates a radial cross-sectional view of another embodiment of a wireline cable.

FIG. 10 illustrates a torque balanced cable 1000 for tractor operations according to another embodiment of the present disclosure similar to the cable 200, except as described below. As shown, the cable 1000 includes a core 1002 having a plurality of conductors 1004. As a non-limiting example, each of the conductors 1004 is formed from a plurality of conductive strands 1006 with an insulator 1008 disposed therearound. In certain embodiments an interstitial void 1010 formed between adjacent insulators 1008 is filled with semi-conductive or non-conductive filler (e.g. filler strands, insulator filler). As a further non-limiting example, a layer of insulative material 1011 (e.g. polymer) is circumferentially disposed around the core 1002.

The core 1002 and the insulative material 1011 are surrounded by an inner layer of armor wires 1012 which is surrounded by an outer layer of armor wires 1014. A polymer jacket 1016 is circumferentially disposed (e.g. pressure extruded) on to the outer layer 1014 to fill an interstitial void between the members of the outer layer 1014. As a non-limiting example, that jacket 1016 includes a substantially smooth outer surface 1018 to minimize a friction coefficient thereof. As shown, the jacket 1016 is applied only on the outer layer 1014 and does not abut the core 1002 or the layer of insulative material 1011. In certain embodiments, the jacket 1016 is not chemically or physically bonded to the members of the outer layer 1014.

Figure 11:
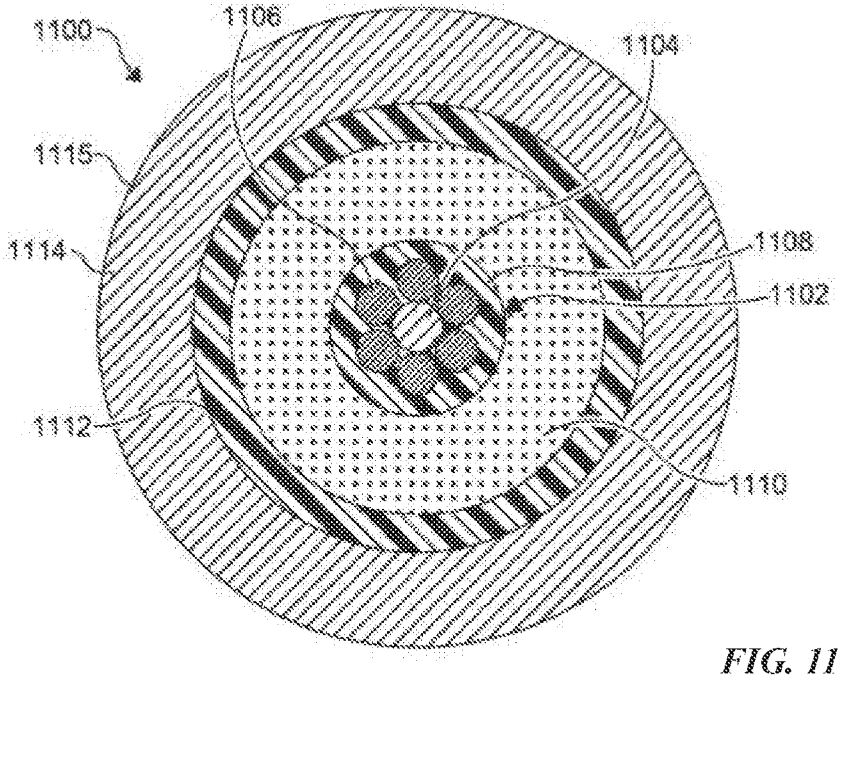
FIG. 11 illustrates a radial cross-sectional view of another embodiment of a wireline cable.

FIG. 11 illustrates a torque balanced cable 1100 for tractor operations according to another embodiment of the present disclosure. As shown, the cable 1100 includes a core 1102 having an optical fiber 1104 centrally disposed therein. A plurality of conductive strands 1106 are disposed around the optical fiber 1104 and embedded in an insulator 1108. The core 1102 may comprise more than one optical fiber 1104 and/or conductive strands 1106 to define multiple power and telemetry paths for the cable 1100.

The core 1102 is surrounded by an inner strength member layer 1110 which is typically formed from a composite long fiber reinforced material such as a UN-curable or thermal curable epoxy or thermoplastic. As a non-limiting example, the inner armor layer 1110 is pultruded or rolltruded over the core 1102. As a further non-limiting example, a second layer (not shown) of virgin, UN-curable or thermal curable epoxy is extruded over the inner armor layer 1110 to create a more uniformly circular profile for the cable 1100.

A polymeric jacket 1112 may be extruded on top of the inner strength member layer 1110 to define a shape (e.g. round) of the cable 1100. An outer metallic tube 1114 is drawn over the jacket 1112 to complete the cable 1100. As a non-limiting example, the outer metallic tube 1114 includes a substantially smooth outer surface 1115 to minimize a friction coefficient thereof. The outer metallic tube 1114 and the inner armor layer 1110 advantageously act together or independently as strength members. Each of the inner strength member layer 1110 and the outer metallic tube

1114 are at zero lay angles, therefore, the cable 1100 is substantially torque balanced.

Figure 12:
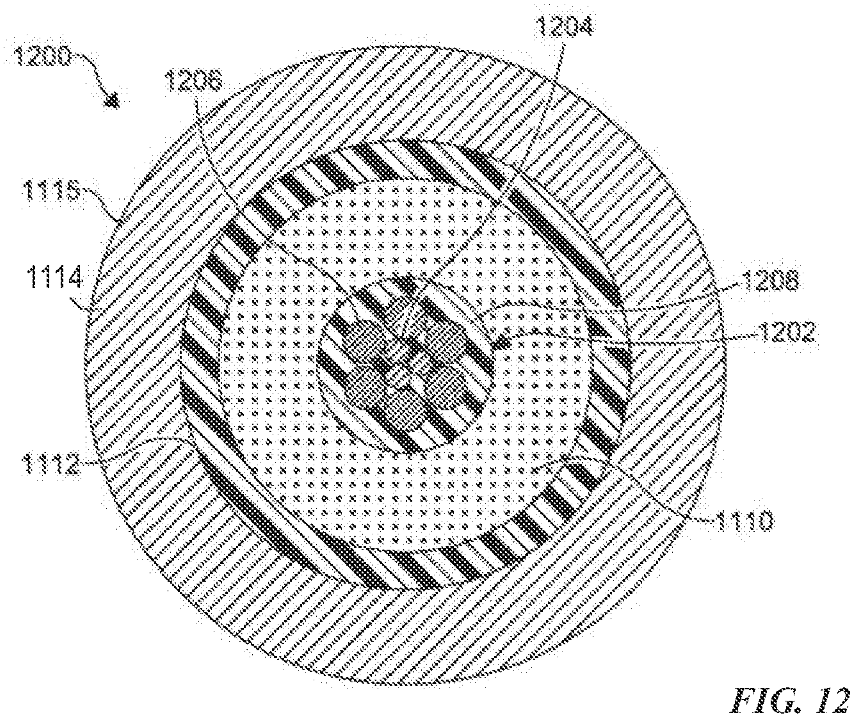
FIG. 12 illustrates a radial cross-sectional view of another embodiment of a wireline cable.

FIG. 12 illustrates a torque balanced cable 1200 for tractor operations according to another embodiment of the present disclosure similar to the cable 1100, except as described below. As shown, the cable 1200 includes a core 1202 having a plurality of optical fibers 1204 disposed therein. A plurality of conductive strands 1206 are disposed around the optical fibers 1204 and embedded in an insulator 1208. The core 1202 may comprise more than one optical fiber 1204 and/or conductive strands 1206 to define multiple power and telemetry paths for the cable 1200.

Figure 13:
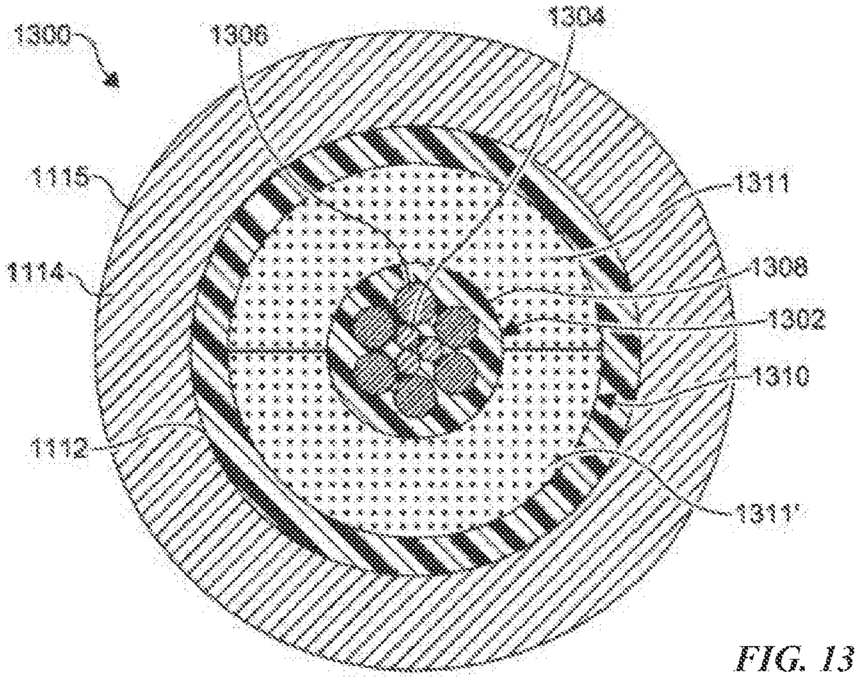
FIG. 13 illustrates a radial cross-sectional view of another embodiment of a wireline cable.

FIG. 13 illustrates a torque balanced cable 1300 for tractor operations according to another embodiment of the present disclosure similar to the cable 1100, except as described below. As shown, the cable 1300 includes a core 1302 having a plurality of optical fibers 1304 disposed therein. A plurality of conductive strands 1306 are disposed around a configuration of the optical fibers 1304 and embedded in an insulator 1308.

The core 1302 is surrounded by an inner strength member layer 1310 which is typically formed from a composite long fiber reinforced material such as a UN-curable or thermal curable epoxy or thermoplastic. As a non-limiting example, the inner armor layer 1310 is pultruded or rolltruded over the core 1302. As a further non-limiting example, the inner armor layer 1310 is formed as a pair of strength member sections 1311, 1311', each of the sections 1311, 1311' having a semi-circular shape when viewed in axial cross-section.

Figure 14:
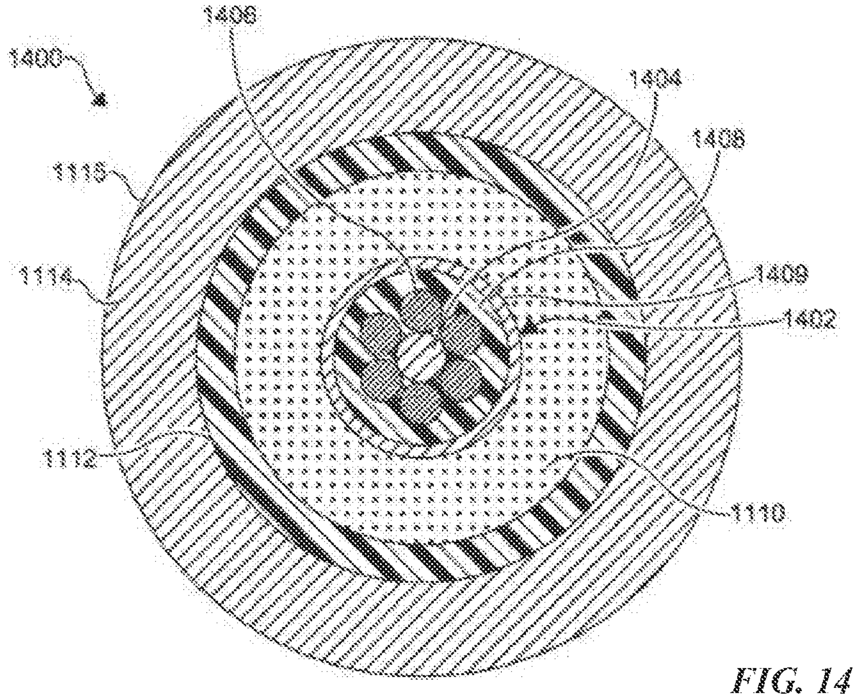
FIG. 14 illustrates a radial cross-sectional view of another embodiment of a wireline cable.

FIG. 14 illustrates a torque balanced cable 1400 for tractor operations according to another embodiment of the present disclosure similar to the cable 1100, except as described below. As shown, the cable 1400 includes a core 1402 having an optical fiber 1404 centrally disposed therein. A plurality of conductive strands 1406 are disposed around the optical fiber 1404 and embedded in an insulator 1408. The core 1402 is surrounded by an inner metallic tube 1409 having a lay angle of substantially zero. It is understood that the inner metallic tube 1409 can have any size and thickness and may be utilized as a return path for electrical power.

The present disclosure relates to a wireline cable that utilizes soft polymers as interstitial fillers beneath and between the armor wire layers, which soft polymers may be any suitable material, including but not limited to the following: polyolefin or olefin-base elastomer (such as Engage®, Infuse®, etc.); thermoplastic vulcanizates (TPVs) such as Santoprene® and Super TPVs and fluoro TPV (F-TPV); silicone rubber; acrylate rubber; soft engineering plastics (such as soft modified polypropylene sulfide (PPS] or modified Poly-ether-ether-ketone [PEEK]); soft fluoropolymer (such as high-melt flow ETFE (ethylene-tetrafluoroethylene) fluoropolymer; fluoroelastomer (such as DAI-EL™ manufactured by Daikin); and thermoplastic fluoropolymers.

The above polymers can be also used with various additives to meet the mechanical requirement.

Armor wire strength members may be any suitable material typically used for armor wires, such as: galvanized improved plow steel (with a variety of strength ratings); high-carbon steel; and 27-7 Molybdenum. These may be used as solid armors or stranded members.

Low-temperature polymers may be used for the polymeric jacketing layers to enable the armoring process to be stopped without damaging the cable core. This strategy, as discussed below, requires that the "low-temperature" polymers have process temperatures 25° F. to 50° F. below those used in the cable core. Possible jacketing materials include: polyolefin-base and acrylate-base polymers with process temperatures in ranging from 300° F. to 450° F.; and fluoropolymer with lower melting point.

The core polymers are chosen to have higher melting point than the processing temperature of the polymers selected to fill the space between the core and inner wire, and also the space between inner armor and outer armor wires. This allows combining the armoring and extrusion process at the same time to stop the armoring process for trouble-shooting when needed with no concerns of getting melted and thermally degraded core polymers in the extrusion crosshead.

The key to achieving torque balance between the inner and outer armor wire layers is to size the inner armor wires appropriately to carry their share of the load. Given the likelihood that some minimal amount of stretch may occur, these designs begin with the inner armor wires carrying slightly approximately 60 percent of the load. Any minimal stretch that may occur (which tends to shift load to the outer armor wires) will therefore only tend to slightly improve torque balance between the armor wire layers.

In a torque-balanced cable: $Torque_i = Torque_o$,

Where: $Torque_i$=Torque of the inner armor wires; and $Torque_o$=Torque of the outer armor wires.

Torque for a layer of armor wires in a wireline cable can be measured by applying the following equation:

$$Torque = \frac{1}{4} T \times PD \times \sin 2\alpha$$

Where: T=Tension along the direction of the cable; PD=Pitch diameter of the armor wires; and α=Lay angle of the wires.

The primary variable to be adjusted in balancing torque values for armor wires applied at different circumferences is the diameter of the wires. The lay angles of the inner and outer armor wires are typically roughly the same, but may be adjusted slightly to optimize torque values for different diameter wires. Because the inner layer of wires has a smaller circumference, the most effective strategy for achieving torque balance is for their individual diameters to be larger than those in the outer layer. Several sample embodiments of torque-balanced, gas-blocking wireline cable designs are described below that apply these principles. In no way do these examples describe all of the possible configurations that can be achieved by applying these basic principles.

Another embodiment is a 0.26±0.02 inch diameter mono/coaxial/triad or other configuration wireline cable with torque balance and gas-blocking design (FIGS. 15A through 15D)

Figure 15D:
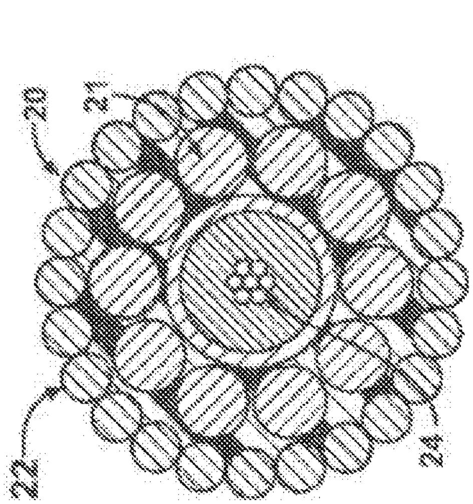
FIGS. 15A-15D illustrate radial cross-sectional views of an example embodiment of a wireline mono cable.
Figure 16D:
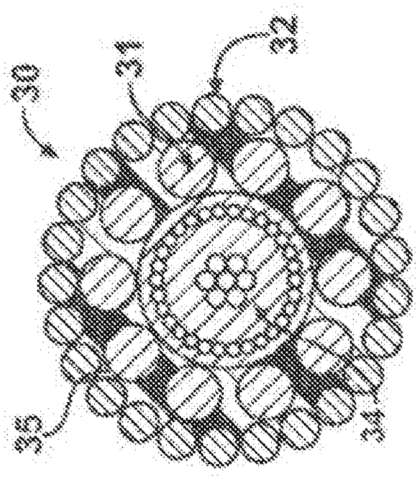
FIGS. 16A-16D illustrate radial cross-sectional views of an example embodiment of a wireline coaxial cable.
Figure 15C:
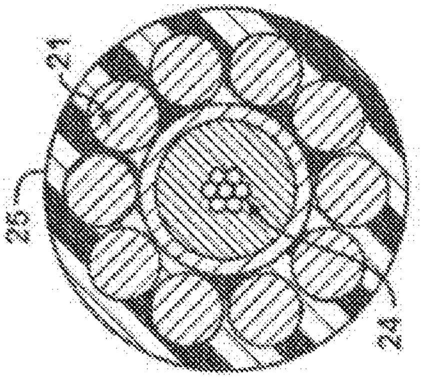
Figure 16C:
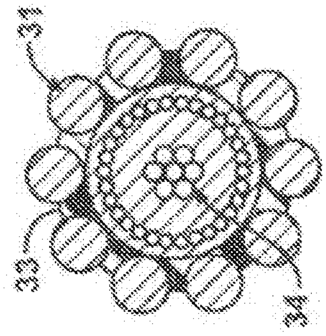
Figure 15B:
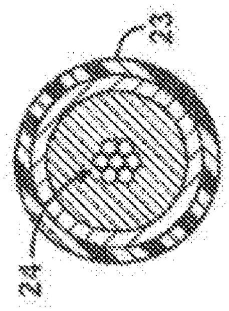
Figure 16B:
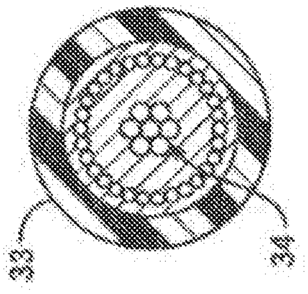
Figure 15A:
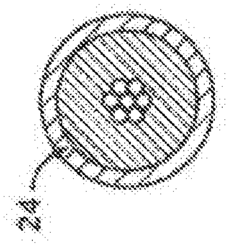
Figure 16A:
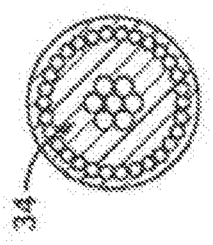
Figure 17A:
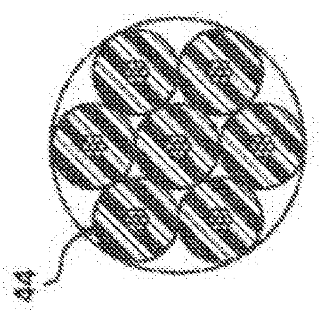
FIGS. 17A-17D illustrate radial cross-sectional views of an example embodiment of a wireline hepta cable.
Figure 17B:
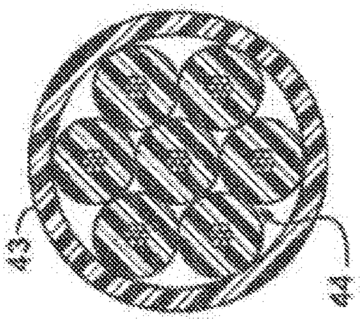
Figure 17C:
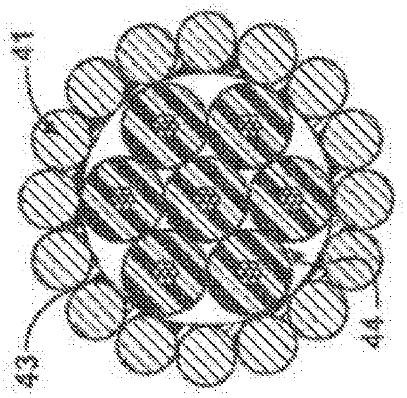
Figure 17D:
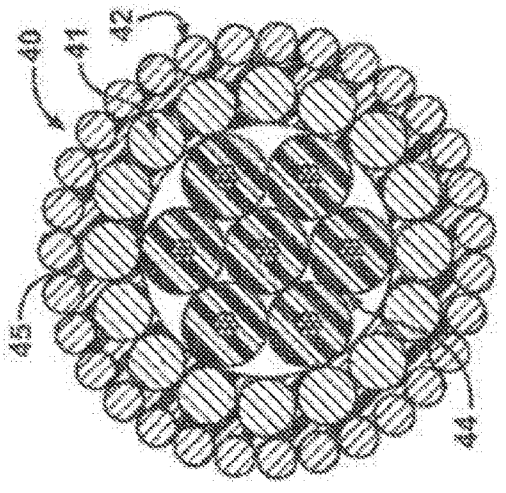

For a mono/coaxial/triad or any other configuration wireline cable 20 with a core diameter of 0.10-0.15 inch and a completed diameter of 0.26±0.02 inch, torque balance could be achieved with inner armor wires 21 of 0.035-0.055 inch diameter and outer armor wires 22 with diameters of 0.020-0.035 inch. The gas blocking is achieved by placing a layer 23 of soft polymer (FIG. 15B) over the cable core 24 (FIG. 15A) before the inner armor wires 21 are cabled over the core (FIG. 15C). The inner armor wires 21 imbed partially into the soft polymer layer 23 such that no gaps are left between the inner armor wires and the cable core. A second layer 25 of soft polymer (FIG. 15C) is optionally extruded over the inner armor wires 21 before the outer armor wires 22 are applied to the cable (FIG. 15D). The second layer 25 of soft polymer fills any spaces between the inner and outer armor wires layers and prevents pressurized gas from infiltrating between the armor wires. By eliminating space for the inner armor wires to compress into the cable core 24, the cable 20 also significantly minimizes cable stretching which helps to further protect the cable against developing torque imbalance in the field. For the values given for this cable, the inner armor wire layer 21 will carry approximately 60% of the load.

Another embodiment is a 0.32±0.02 inch diameter mono/coaxial/hepta or other configuration wireline cable with torque balance and gas-blocking design (FIGS. 16A through 16D)

For a mono/coaxial/hepta or any other configuration wireline cable 30 with a core diameter of 0.12-0.2 inch and a completed diameter of 0.32±0.02 inch, torque balance could be achieved with inner armor wires 31 of 0.04-0.06 inch diameter and outer wires 32 with diameters of 0.02-0.04 inch. The gas blocking is achieved by placing a layer 33 of soft polymer (FIG. 16B) over the cable core 34 (FIG. 16A) before the inner armor wires are cabled over the core. The inner armor wires 31 imbed partially into the soft polymer layer 33 (FIG. 16C) such that no gaps are left between the inner armor wires and the cable core 34. A second layer 35 of soft polymer (FIG. 16D) is optionally extruded over the inner armor wires 31 before the outer armor wires 32 are applied to the cable 30. The second layer 35 of soft polymer fills any spaces between the inner and outer armor wires layers and prevents pressurized gas from infiltrating between the armor wires. By eliminating space for the inner armor wires to compress into the cable core 34, the cable 30 also significantly minimizes cable stretching which helps to further protect the cable against developing torque imbalance in the field. For the values given for this cable, the inner armor wire layer 31 will carry approximately 60% of the load.

Another embodiment is a 0.38±0.02 inch diameter hepta/triad/quad or any other configuration wireline cable with torque balance and gas blocking (FIGS. 17A through 17D)

For a hepta/triad/quad or any other wireline cable 40 configuration with a core diameter of 0.24-0.29 inch and a completed diameter of 0.38±0.02 inch, torque balance could be achieved with inner armor wires 41 of 0.04-0.06 inch diameter and outer wires 42 with diameters of 0.025-0.045 inch. The gas blocking is achieved by placing a layer 43 of soft polymer (FIG. 17B) over the cable core 44 (FIG. 17A) before the inner armor wires 41 are cabled over the core. The inner armor wires 41 imbed partially into the soft polymer (FIG. 17C) such that no gaps are left between the inner armor wires and the cable core 44. A second layer 45 of soft polymer (FIG. 17D) is optionally extruded over the inner armor wires 41 before the outer armor wires 42 are applied to the cable 40. The second layer 45 of soft polymer fills any spaces between the inner and outer armor wires layers and prevents pressurized gas from infiltrating between the armor wires. By eliminating space for the inner armor wires 41 to compress into the cable core 44, the cable 40 also significantly minimizes cable stretching which helps to further protect the cable against developing torque imbalance in the field. For the values given for this cable, the inner armor wire layer will carry approximately 60% of the load.

Another embodiment is a 0.42±0.02 inch diameter hepta/triad/quad or any other configuration wireline cable with torque balance and gas blocking (FIGS. 18A through 18D)

Figure 18A:
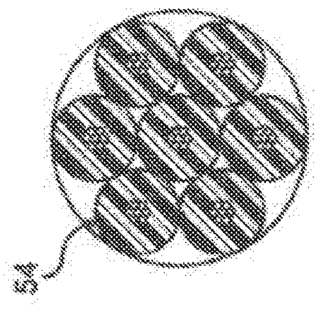
FIGS. 18A-18D illustrate radial cross-sectional views of another embodiment of a wireline hepta cable.
Figure 18B:
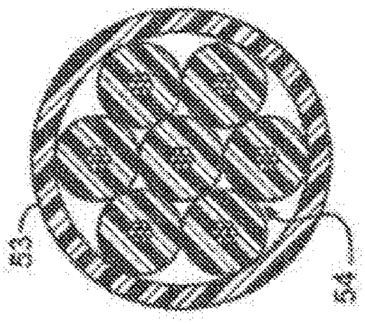
Figure 18C:
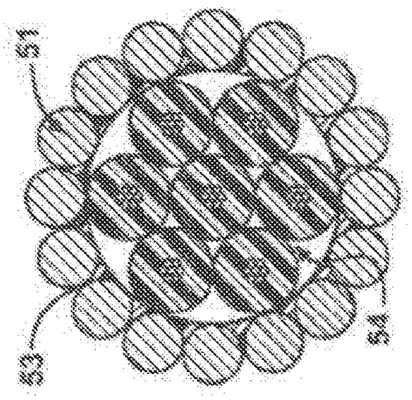
Figure 18D:
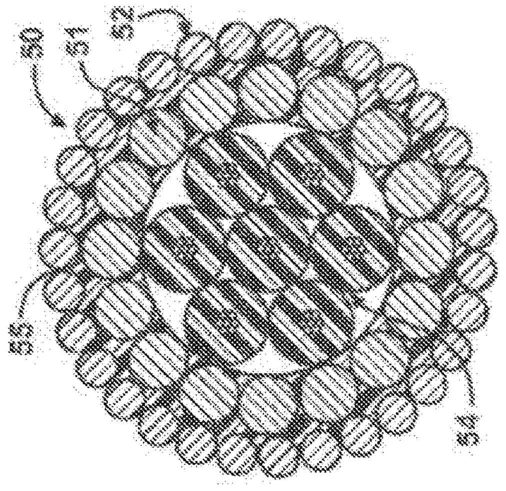

For a hepta/triad/quad or any other wireline cable 50 configuration with a core diameter of 0.25-0.30 inch and a completed diameter of 0.42±0.02 inch, torque balance could be achieved with inner armor wires 51 of 0.04-0.06 inch diameter and outer armor wires 52 with diameters of 0.025-0.045 inch. The gas blocking is achieved by placing a layer 53 of soft polymer (FIG. 18B) over the cable core 54 (FIG. 18A) before the inner armor wires 51 are cabled over the core (FIG. 18C). The inner armor wires 51 imbed partially into the soft polymer layer 53 such that no gaps are left between the inner armor wires and the cable core 54. A second layer 55 of soft polymer (FIG. 18D) is optionally extruded over the inner armor wires 51 before the outer armor wires 52 are applied to the cable 50. The second layer 55 of soft polymer fills any spaces between the inner and outer armor wires layers and prevents pressurized gas from infiltrating between the armor wires. By eliminating space for the inner armor wires 51 to compress into the cable core 54, the cable 50 also significantly minimizes cable stretching which helps to further protect the cable against developing torque imbalance in the field. For the values given for this cable, the inner armor wire layer will carry approximately 60% of the load.

Another embodiment is a 0.48±0.02 inch diameter hepta/triad/quad or any other configuration wireline cable with torque balance and gas blocking (FIGS. 19A through 19D)

Figure 19D:
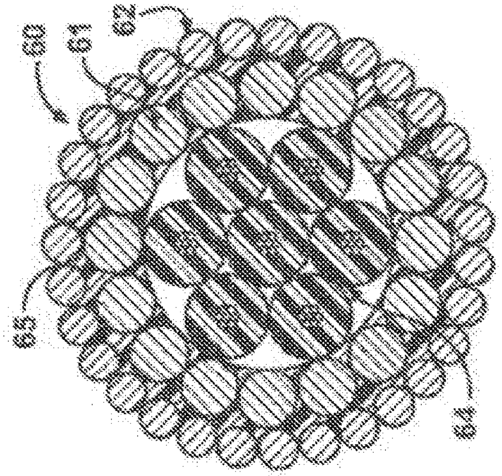
FIGS. 19A-19D illustrate radial cross-sectional views of another embodiment of a wireline hepta cable.
Figure 19C:
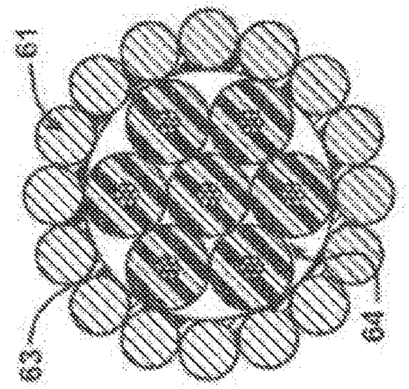
Figure 19B:
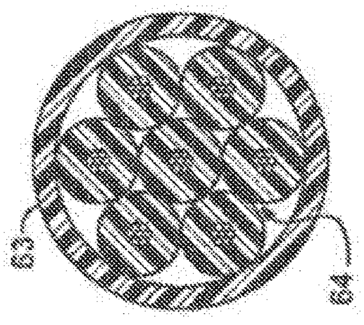
Figure 19A:
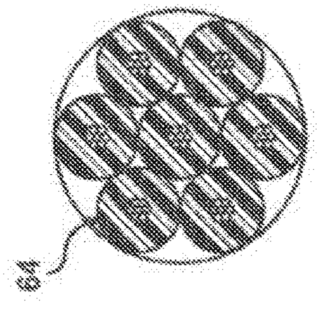

For a hepta/triad/quad or any other wireline cable 60 configuration with a core diameter of 0.20-0.35 inch and a completed diameter of 0.48±0.02 inch, torque balance could be achieved with inner armor wires 61 of 0.05-0.07 inch diameter and outer armor wires 62 with diameters of 0.03-0.05 inch. The gas blocking is achieved by placing a layer 63 of soft polymer (FIG. 19B) over the cable core 64 (FIG. 19A) before the inner armor wires 61 are cabled over the core (FIG. 19C). The inner armor wires 61 imbed partially into the soft polymer layer 63 such that no gaps are left between the inner armor wires and the cable core 64. A second layer 65 of soft polymer (FIG. 19D) is optionally extruded over the inner armor wires 61 before the outer armor wires 62 are applied to the cable 60. The second layer 65 of soft polymer fills any spaces between the inner and outer armor wires layers and prevents pressurized gas from infiltrating between the armor wires. By eliminating space for the inner armor wires 61 to compress into the cable core 64, the cable 60 also significantly minimizes cable stretching which helps to further protect the cable against developing torque imbalance in the field. For the values given for this cable, the inner armor wire layer will carry approximately 60% of the load.

Another embodiment is a 0.52±0.02 inch diameter hepta cable with torque-balanced, gas-blocking design (FIGS. 20A through 20D)

Figure 20D:
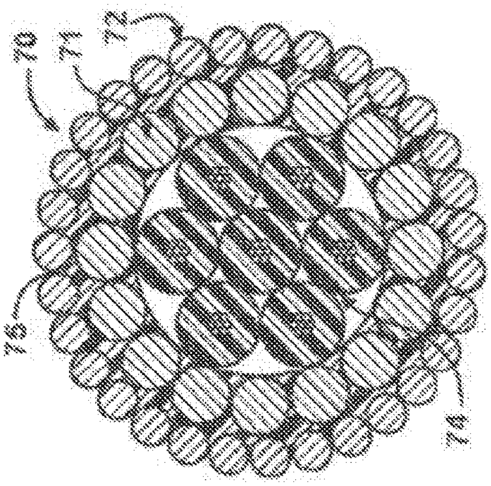
FIGS. 20A-20D illustrate radial cross-sectional views of another embodiment of a wireline hepta cable.
Figure 20C:
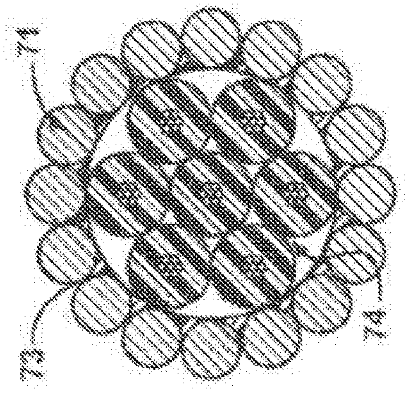
Figure 20B:
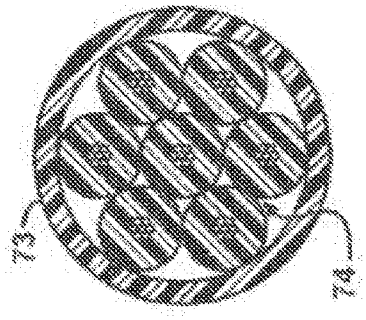
Figure 20A:
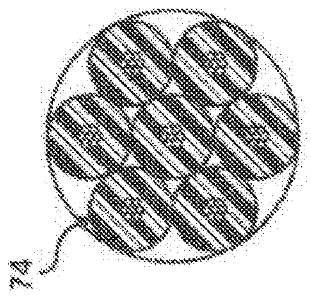

For a hepta cable 70 with a core diameter of 0.25-0.40 inch and a completed diameter of 0.52±0.02 inch, torque balance could be achieved with inner armor wires 71 of 0.05-0.07 inch diameter and outer armor wires 72 with diameters of 0.03-0.05 inch. The gas blocking is achieved by placing a layer 73 of soft polymer (FIG. 20B) over the cable core 74 (FIG. 20A) before the inner armor wires 71 are cabled over the core (FIG. 20C). The inner armor wires 71 imbed partially into the soft polymer layer 73 such that no gaps are left between the inner armor wires and the cable core 74. A second layer 75 of soft polymer (FIG. 20D) is optionally extruded over the inner armor wires 71 before the outer armor wires 72 are applied to the cable 70. The second layer 75 of soft polymer fills any spaces between the inner and outer armor wires layers and prevents pressurized gas from infiltrating between the armor wires. By eliminating space for the inner armor wires 71 to compress into the cable core 74, the cable 70 also significantly minimizes cable stretching which helps to further protect the cable against developing torque imbalance in the field. For the values given for this cable, the inner armor wire layer will carry approximately 60% of the load.

Figure 21:
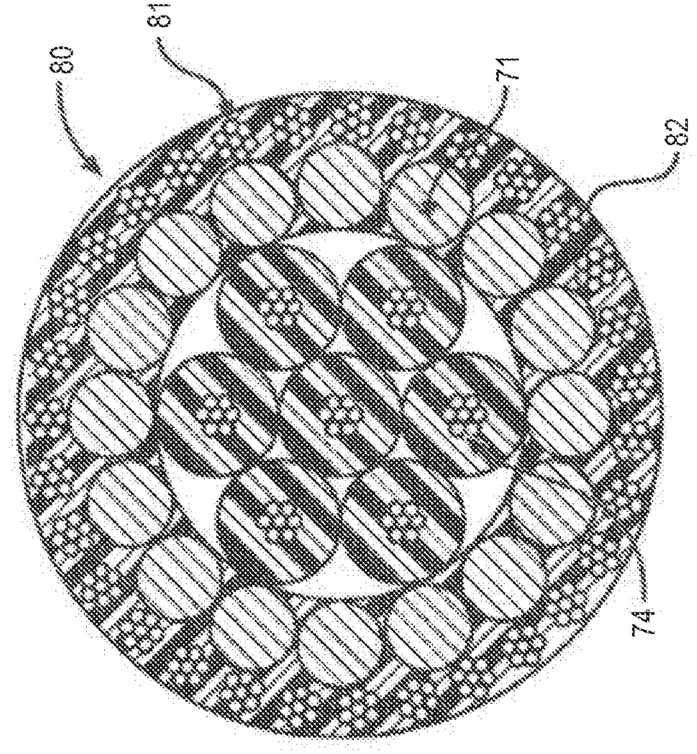
FIG. 21 illustrates a radial cross-sectional view of an example embodiment of a wireline cable.

Another embodiment includes an optional stranded wire outer armoring (FIG. 21)

As an option in any of the embodiments described above, the outer layer of solid armor wires may be replaced with similarly sized stranded wires 81 in a wireline cable 80 as shown in FIG. 21. If a stranded wire is used on the outside, a jacket 82 is put over the top of the stranded wires 81 and bonded to the inner jacket between the stranded wires to not expose the small individual elements directly to well bore conditions of abrasion and cutting.

Figure 22:
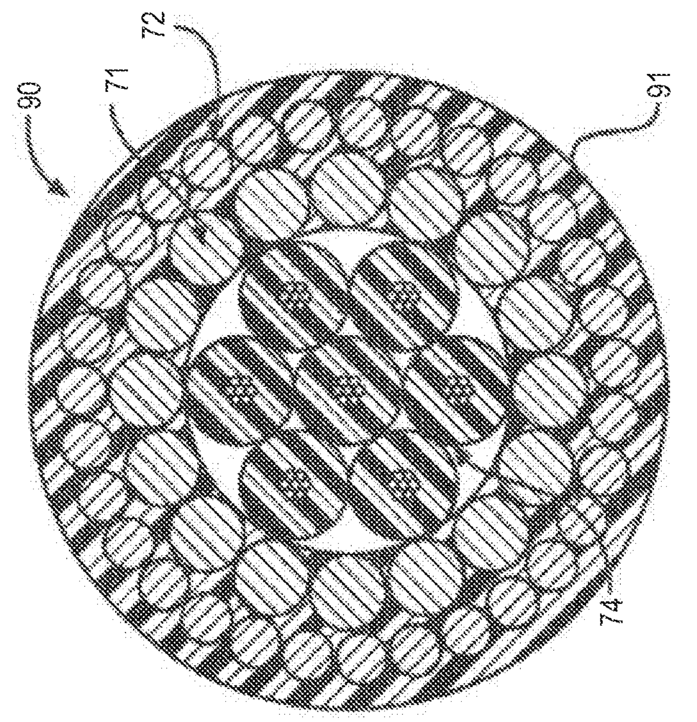
FIG. 22 illustrates a radial cross-sectional view of another embodiment of a wireline cable.

Another embodiment includes an outer, easily sealed polymeric jacket (FIG. 22)

To create torque-balanced, gas-sealed cables that are also more easily sealed by means of a rubber pack-off instead of pumping grease through flow tubes at the well surface, any of the above embodiments may be provided with an outer polymeric jacket 91. To continue the gas-sealed capabilities to the outer diameter of the cable 90, this polymeric material can be bondable to the other jacket layers. For example (as shown in FIG. 22), an outer jacket 91 of carbon-fiber-reinforced ETFE (ethylene-tetrafluoroethylene) fluoropolymer may be applied over the outer armor wire layer 72, bonding through the gaps in the outer strength members. This creates a totally bonded jacketing system and with the addition of the fiber-reinforced polymer, also provides a more durable outer surface. For this, the polymer that is placed between the inner and outer armor layers needs to bond to the jacket placed on top of the outer armor wires 72 through the gap in the outer armor wires.

Figure 23:
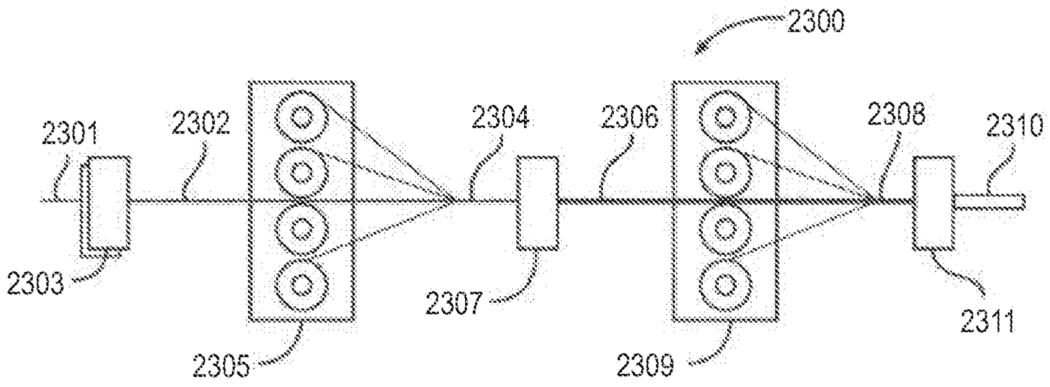
FIG. 23 illustrates a schematic representation of a manufacturing line for constructing wireline cable.

In any of the above-described embodiments, polymers for the armor-jacketing layers may be chosen with significantly lower process temperatures (25° F. to 50° F. lower) than the melting point of polymers used in the cable core. This enables the armoring process to be stopped and started during armoring without the risk that prolonged exposure to extruding temperatures will damage the cable core. This on-line process is as follows with reference to a schematic representation of a wireline cable manufacturing line 2300 shown in FIG. 23:

A cable core 2301 enters the armoring process line 2300 at the left in FIG. 23.

A layer of soft polymer 2302 is extruded over the cable core 2301 in a first extrusion station 2303. The soft outer polymer allows for better and more consistent embedding of the armor wires into the polymer. In case that the cable core 2301 needs to be protected during the armoring process or harsh field operation, dual layers of hard and soft polymers can be co-extruded over the cable core. A hard polymer layer placed underneath a soft polymer layer is mechanically resistant so that such a layer could prevent armor wires from breaking into the cable core through the soft layer. Alternatively this layer could be extruded prior to the armoring process.

An inner armor wire layer 2304 is cabled helically over and embedded into the soft polymer 2302 at a first armoring station 2305. While armoring, any electromagnetic heat source such as infrared waves, ultrasonic waves, and microwaves may be used to further soften the polymers to allow the armoring line 2300 to be run faster. This could be applied before the armor hits the core or after the armor touches the core.

A second layer 2306 of soft polymer is extruded over the embedded inner layer 2304 of armor wires at a second extrusion station 2307.

An outer armor wire layer 2308 is cabled (counterhelically to the inner armor wire layer 2304) over and embedded into the soft polymer 2306 at a second armoring station 2309. While armoring, any electromagnetic heat source such as infrared waves, ultrasonic waves, and microwaves maybe used to further soften polymers to allow the armoring line 2300 to be run faster. This could be applied before the armor hits the core or after the armor touches the core.

If needed, a final layer 2310 of hard polymer is extruded over the embedded outer armor wire layer 2308 at a third extrusion station 2311 to complete the cable as described above.

Although the on-line combined process as described is preferred to save a significant amount of manufacturing time, each step of the process can be separated for accommodation of process convenience.

Figure 24:
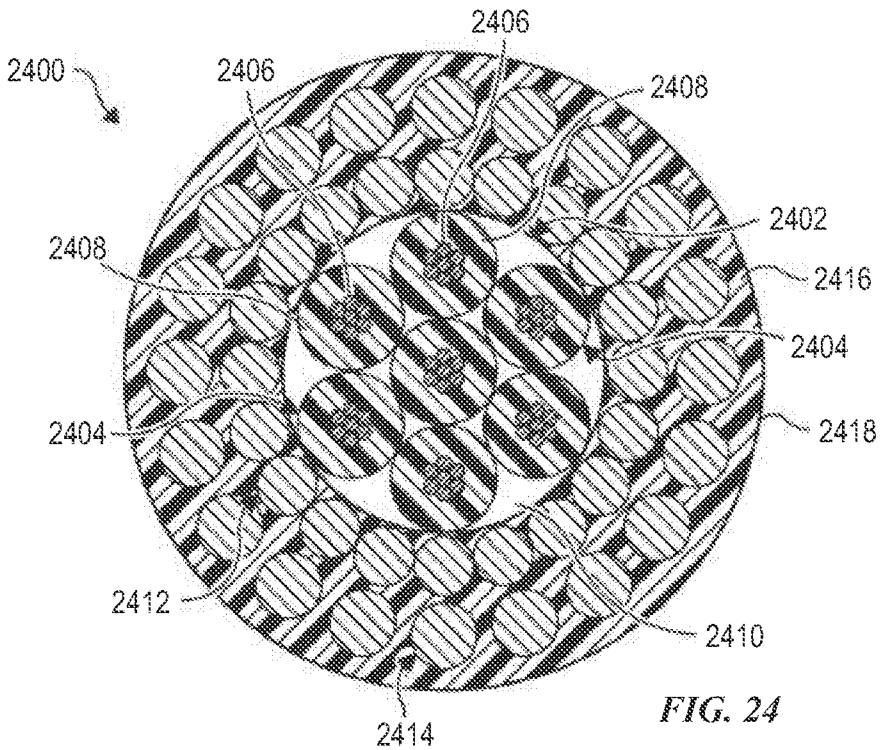
FIG. 24 illustrates a radial cross-sectional view of an example embodiment of a wireline cable.

Referring to FIG. 24, there is illustrated a torque balanced cable 2400 for downhole operations according to an example embodiment of the present disclosure. As shown, the cable 2400 includes a core 2402 having a plurality of conductors 2404. As a non-limiting example, each of the conductors 2404 is formed from a plurality of conductive strands 2406 disposed adjacent each other with an insulator 2408 disposed therearound. As a further non-limiting example, the core 2402 includes seven distinctly insulated conductors 2404 disposed in a hepta cable configuration. However, any number of conductors 2404 can be used in any configuration, as desired. In certain embodiments an interstitial void 2410 formed between adjacent insulators 2408 is filled with a semi-conductive (or non-conductive) filler (e.g. filler strands, polymer insulator filler).

The core 2402 is surrounded by an inner layer of armor wires 2412 (e.g. high modulus steel strength members) which is surrounded by an outer layer of armor wires 2414. The armor wires 2412 and 2414 may be alloy armor wires. As a non-limiting example the layers 2412, 2414 are contra helically wound with each other. As shown, a coverage of the circumference of the outer layer 2414 over the inner layer 2412 is reduced from the 98% coverage found in conventional wireline cables to a percentage coverage that matches a torque created by the inner layer 2412. As a non-limiting example the coverage of the outer layer 2414 over the inner layer is between about 60% to about 88%. As another non-limiting example, the coverage of the outer layer 2414 over the inner layer is between about 50% to about 96%. The reduction in the coverage allows the cable 2400 to achieve torque balance and advantageously minimizes a weight of the cable 2400. An interstitial void created in the outer layer 2414 (e.g. between adjacent ones of the armor wires of the outer layer 2414) is filled with a polymer as part of a jacket 2416. In the embodiment shown, the jacket 2416 encapsulates at least each of the layers 2412, 2414. As a non-limiting example, that jacket 2416 includes a substantially smooth outer surface 2418 (i.e. exterior surface) to minimize a friction coefficient thereof. It is understood that various polymers and other materials can be used to form the jacket 2416. As a further non-limiting example, the smooth outer jacket 2416 is bonded from the core 2402 to the outer surface 2418. In certain embodiments, the coefficient of friction of a material forming the jacket 2416 is lower than a coefficient of friction of a material forming the interstices or interstitial voids of the layers 2412, 2414. However, any materials having any coefficient of friction can be used.

In operation, the cable 2400 is coupled to a tractor and/or other wellbore service equipment in a configuration known in the art. The cable 2400 is introduced into the wellbore, wherein a torque on the cable 2400 is substantially balanced and a friction between the cable 2400 and the wellbore is minimized by the smooth outer surface 2418 of the jacket

2416. It is understood that various tool strings, such as the tool string 104, can be attached or coupled to the cable 2400 and the tractor, such as the tractor 102, to perform various well service operations known in the art including, but not limited to, a logging operation, a mechanical service operation, or the like.

Figure 25:
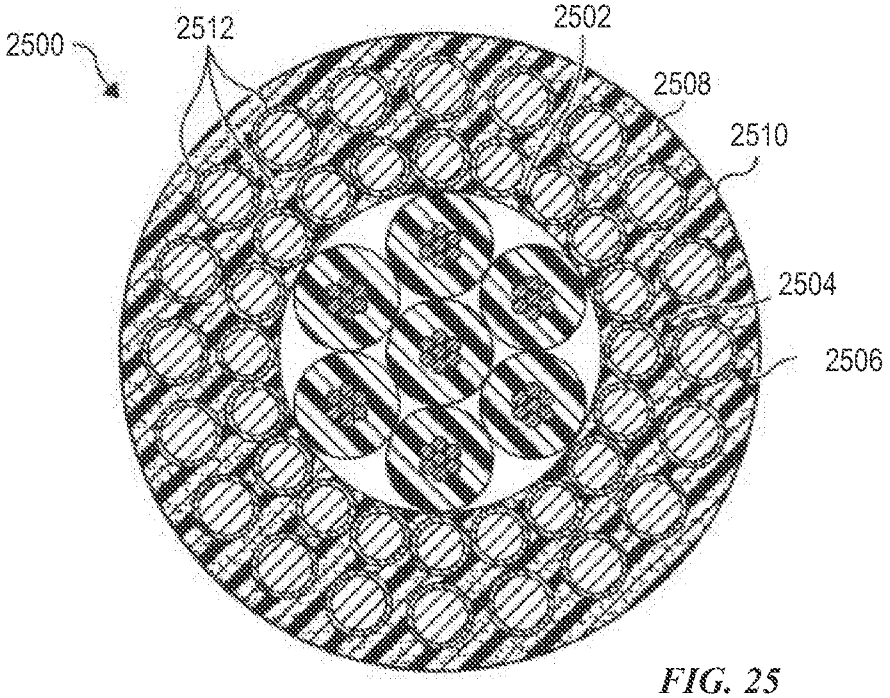
FIG. 25 illustrates a radial cross-sectional view of another embodiment of a wireline cable.

FIG. 25 illustrates a torque balanced cable 2500 for downhole operations according to another embodiment of the present disclosure similar to the cable 2400, except as described below. As shown, the cable 2500 includes a core 2502, an inner layer of armor wires 2504, an outer layer of armor wires 2506, and a polymeric jacket 2508. As a non-limiting example, the jacket 2508 is formed from a fiber reinforced polymer that encapsulates each of the layers 2504, 2506. As a non-limiting example, the jacket 2508 includes a smooth outer surface 2510 to reduce a frictional coefficient thereof. It is understood that various polymers and other materials can be used to form the jacket 2508.

An outer surface of each of the layers 2504, 2506 includes a suitable metallic coating 2512 or suitable polymer coating to bond to the polymeric jacket 2508. Therefore, the polymeric jacket 2508 becomes a composite in which the layers 2504, 2506 (e.g. high modulus steel strength members) are embedded and bonded in a continuous matrix of polymer from the core 2502 to the outer surface 2510 of the jacket 2508. It is understood that the bonding of the layers 2504, 2506 to the jacket 2508 minimizes stripping of the jacket 2508.

Figure 26:
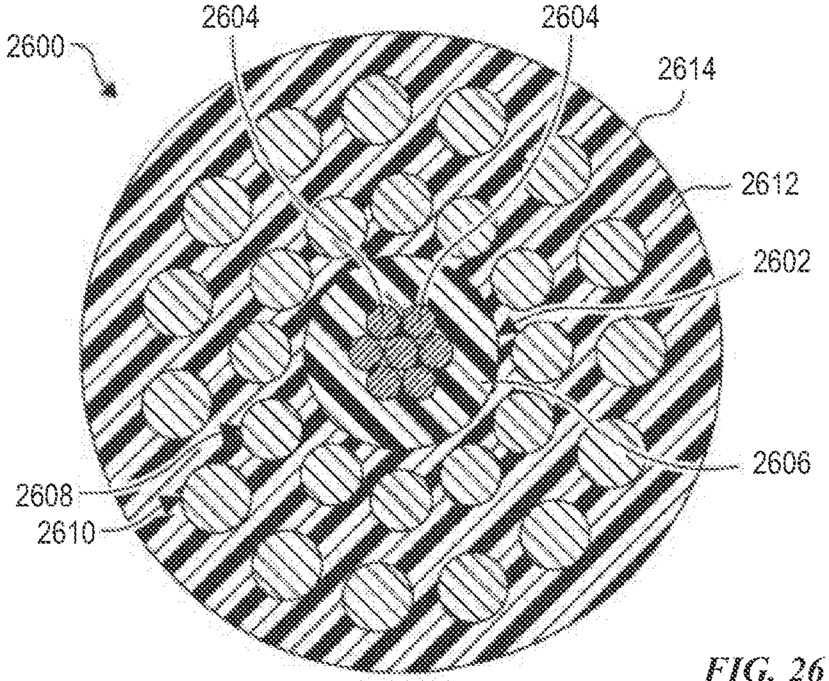
FIG. 26 illustrates a radial cross-sectional view of another embodiment of a wireline cable.

FIG. 26 illustrates a torque balanced cable 2600 for downhole operations according to another embodiment of the present disclosure similar to the cable 2400, except as described below. As shown, the cable 2600 includes a core 2602 having a plurality of conductive strands 2604 embedded in a polymeric insulator 2606. It is understood that various materials can be used to form the conductive strands 2604 and the insulator 2606.

The core 2602 is surrounded by an inner layer of armor wires 2608 which is surrounded by an outer layer of alloy armor wires 2610. An interstitial void created in the outer layer 2610 (e.g. between adjacent ones of the armor wires of the outer layer 2610) is filled with a polymer as part of a jacket 2612. In the embodiment shown, the jacket 2612 encapsulates at least each of the layers 2608, 2610. As a non-limiting example, the jacket 2612 includes a substantially smooth outer surface 2614 to minimize a friction coefficient thereof. It is understood that various polymers and other materials can be used to form the jacket 2612. As a further non-limiting example, the jacket 2612 is bonded to the insulator 2606 disposed in the core 2602. In certain embodiments, the coefficient of friction of a material forming the jacket 2612 is lower than a coefficient of friction of a material forming the insulator 2606. However, any materials having any coefficient of friction can be used.

Figure 27:
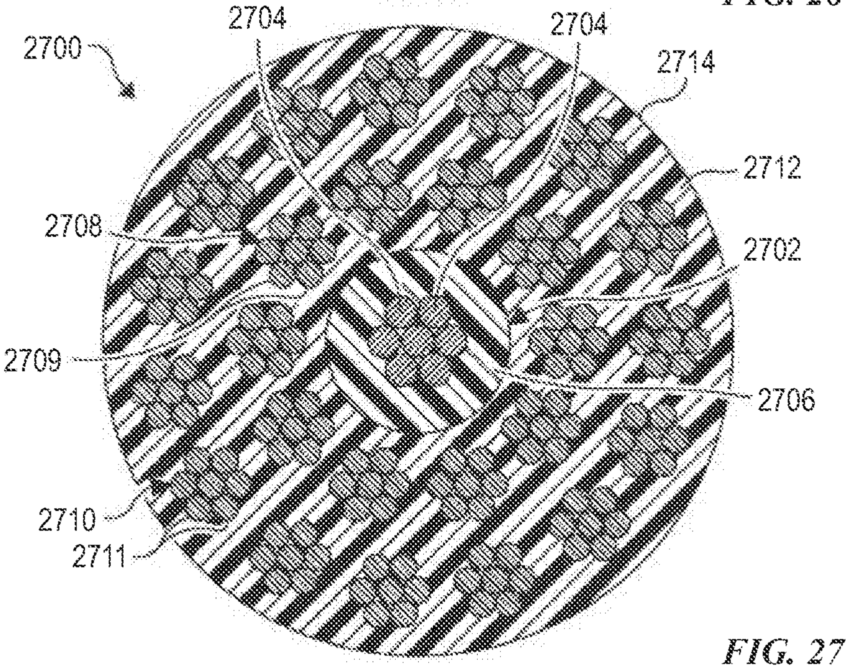
FIG. 27 illustrates a radial cross-sectional view of another embodiment of a wireline cable.

FIG. 27 illustrates a torque balanced cable 2700 for downhole operations according to a fourth embodiment of the present disclosure similar to the cable 2600, except as described below. As shown, the cable 2700 includes a core 2702 having a plurality of conductive strands 2704 embedded in a polymeric insulator 2706. It is understood that various materials can be used to form the conductive strands 2704 and the insulator 2706.

The core 2702 is surrounded by an inner layer of armor wires 2708, wherein each of the armor wires of the inner layer 2708 is formed from a plurality of metallic strands 2709. The inner layer 2708 is surrounded by an outer layer of armor wires 2710, wherein each of the armor wires of the outer layer 2710 is formed from a plurality of metallic strands 2711. As a non-limiting example the layers 2708, 2710 are contra helically wound with each other. An interstitial void created in the outer layer 2710 (e.g. between adjacent ones of the armor wires of the outer layer 2710) is filled with a polymer as part of a jacket 2712. In the embodiment shown, the jacket 2712 encapsulates at least each of the layers 2708, 2710. As a non-limiting example, that jacket 2712 includes a substantially smooth outer surface 2714 to minimize a friction coefficient thereof.

Figure 28:
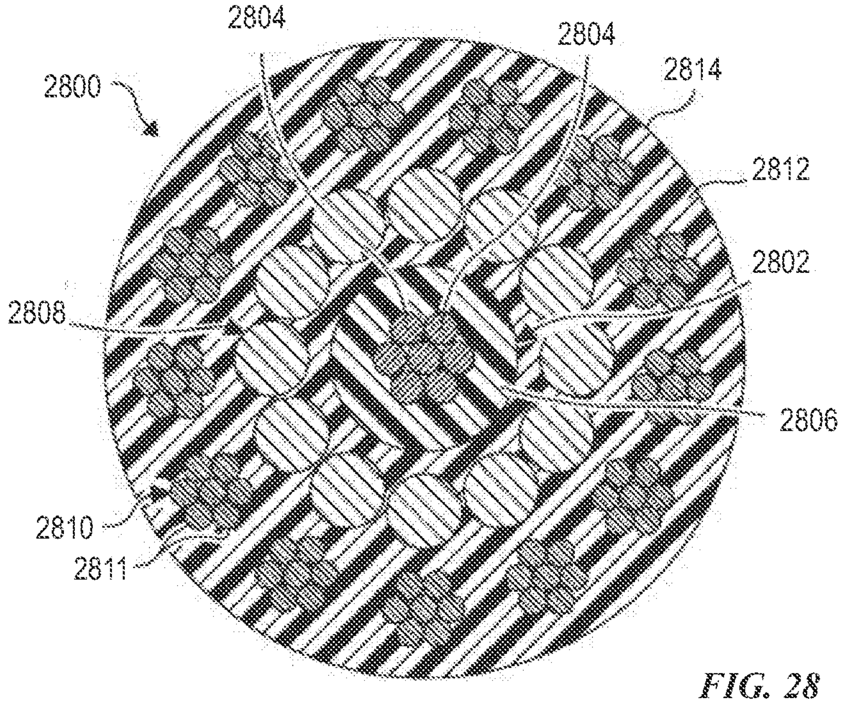
FIG. 28 illustrates a radial cross-sectional view of another embodiment of a wireline cable.

FIG. 28 illustrates a torque balanced cable 2800 for downhole operations according to another embodiment of the present disclosure similar to the cable 2600, except as described below. As shown, the cable 2800 includes a core 2802 having a plurality of conductive strands 2804 embedded in a polymeric insulator 2806. It is understood that various materials can be used to form the conductive strands 2804 and the insulator 2806.

The core 2802 is surrounded by an inner layer of armor wires 2808, wherein each of the armor wires of the inner layer is formed from a single strand. The inner layer 2808 is surrounded by an outer layer of armor wires 2810, wherein each of the armor wires of the outer layer 2810 is formed from a plurality of metallic strands 2811. As a non-limiting example the layers 2808, 2810 are contra helically wound with each other. An interstitial void created in the outer layer 2810 (e.g. between adjacent ones of the armor wires of the outer layer 2810) is filled with a polymer as part of a jacket 2812. In the embodiment shown, the jacket 2812 encapsulates at least each of the layers 2808, 2810. As a non-limiting example, that jacket 2812 includes a substantially smooth outer surface 2814 to minimize a friction coefficient thereof.

Figure 29:
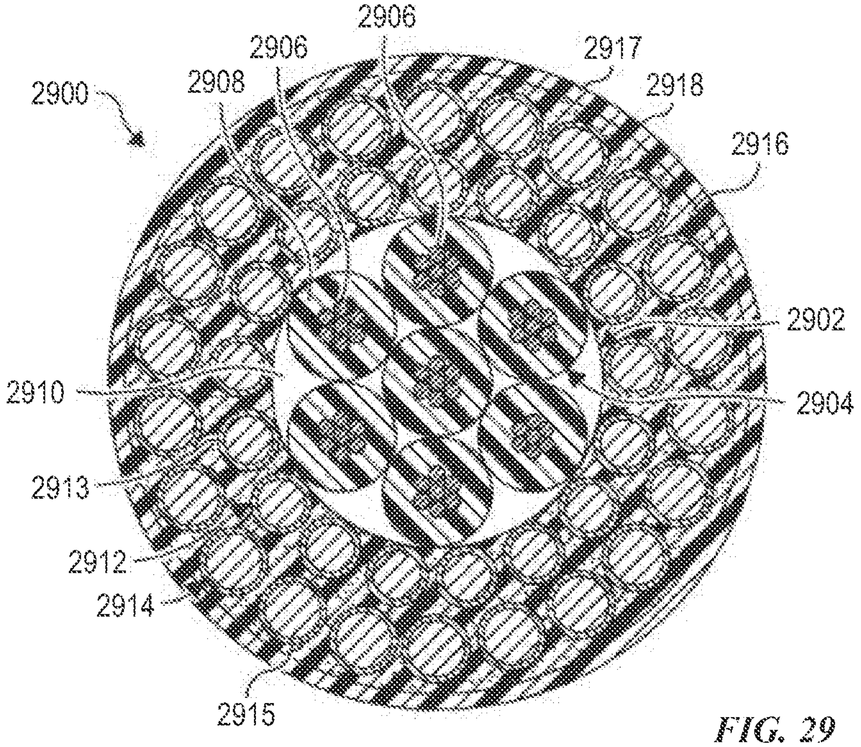
FIG. 29 illustrates a radial cross-sectional view of another embodiment of a wireline cable.

FIG. 29 illustrates a torque balanced cable 2900 for downhole operations according to another embodiment of the present disclosure similar to the cable 2500, except as described below. As shown, the cable 2900 includes a core 2902 having a plurality of conductors 2904. As a non-limiting example, each of the conductors 2904 is formed from a plurality of conductive strands 2906 with an insulator 2908 disposed therearound. In certain embodiments an interstitial void 2910 formed between adjacent insulators 2908 is filled with semi-conductive or non-conductive filler (e.g. filler strands, insulated filler).

The core 2902 is surrounded by an inner layer of armor wires 2912 which is surrounded by an outer layer of armor wires 2914. As a non-limiting example the layers 2912, 2914 are contra helically wound with each other. An outer surface of each of the layers 2912, 2914 includes a suitable metallic coating 2913, 2915 or suitable polymer coating to bond to a polymeric jacket 2916 encapsulating each of the layers 2912, 2914. As a non-limiting example, at least a portion of the jacket 2916 is formed from a fiber reinforced polymer.

In the embodiment shown, an outer circumferential portion 2917 of the jacket 2916 (e.g. 1 to 15 millimeters) is formed from polymeric material without reinforcement fibers disposed therein to provide a smooth outer surface 2918. As a non-limiting example, the outer circumferential portion 2917 may be formed from virgin polymeric material or polymer materials amended with other additives to minimize a coefficient of friction. As a further non-limiting example, a non-fiber reinforced material is disposed on the jacket 2916 and chemically bonded thereto.

Figure 30:
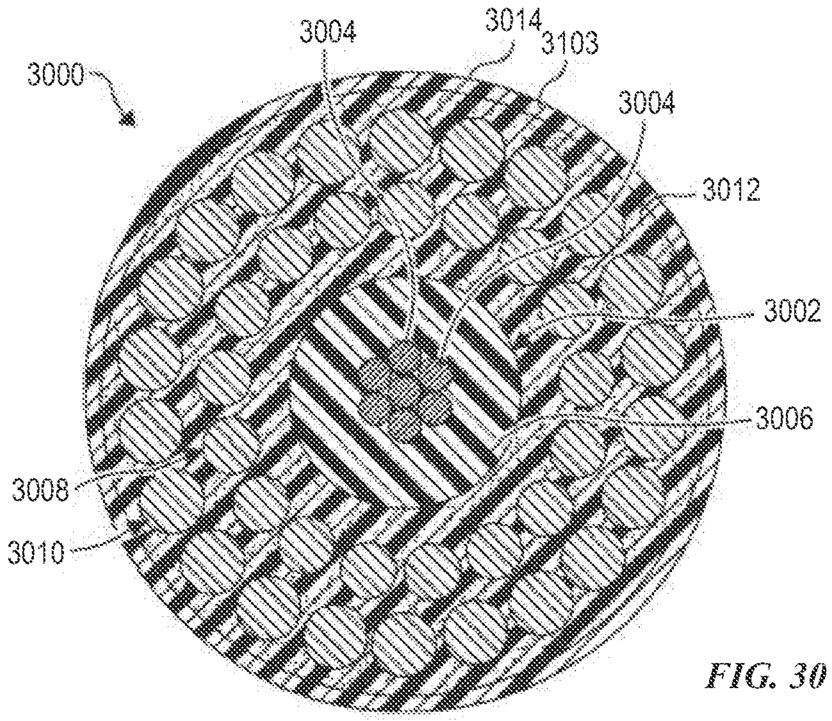
FIG. 30 illustrates a radial cross-sectional view of another embodiment of a wireline cable.

FIG. 30 illustrates a torque balanced cable 3000 for downhole operations according to another embodiment of the present disclosure similar to the cable 2600, except as described below. As shown, the cable 3000 includes a core 3002 having a plurality of conductive strands 3004 embedded in a polymeric insulator 3006. It is understood that various materials can be used to form the conductive strands 3004 and the insulator 3006.

The core 3002 is surrounded by an inner layer of armor wires 3008. The inner layer 3008 is surrounded by an outer layer of armor wires 3010. As a non-limiting example the layers 3008, 3010 are contra helically wound with each other. An interstitial void created in the outer layer 3010 (e.g. between adjacent ones of the armor wires of the outer layer 3010) is filled with a polymer as part of a jacket 3012. As a non-limiting example, at least a portion of the jacket 3012 is formed from a fiber reinforced polymer. As a further non-limiting example, the jacket 3012 encapsulates at least each of the layers 3008, 3010.

In the embodiment shown, an outer circumferential portion 3013 of the jacket 3012 (e.g. 1 to 15 millimeters) is formed from polymeric material without reinforcement fibers disposed therein to provide a smooth outer surface 3014. As a non-limiting example, the outer circumferential portion 3013 may be formed from virgin polymeric material or polymer materials amended with other additives to minimize a coefficient of friction. As a further non-limiting example, a non-fiber reinforced material is disposed on the jacket 3012 and chemically bonded thereto.

Figure 31:
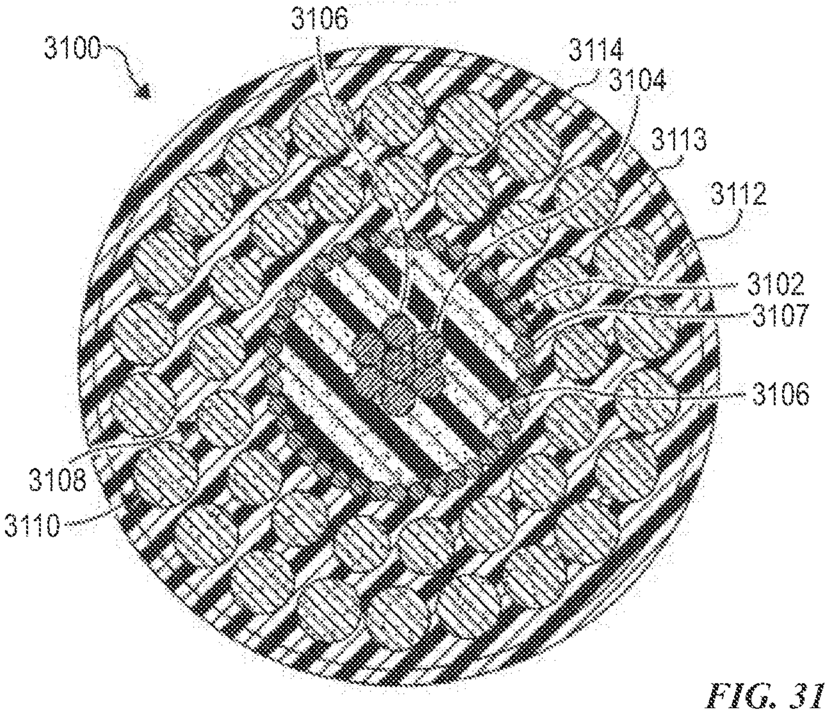
FIG. 31 illustrates a radial cross-sectional view of another embodiment of a wireline cable.

FIG. 31 illustrates a torque balanced cable 3100 for downhole operations according to another embodiment of the present disclosure similar to the cable 2600, except as described below. As shown, the cable 3100 includes a core 3102 having a plurality of conductive strands 3104 embedded in a polymeric insulator 3106. It is understood that various materials can be used to form the conductive strands 3104 and the insulator 3106. The core 3102 includes an annular array of shielding wires 3107 circumferentially disposed adjacent a periphery of the core 3102, similar to conventional coaxial cable configurations in the art. As a non-limiting example, the shielding wires 3107 are formed from copper. However, other conductors can be used.

The core 3102 and the shielding wires 3107 are surrounded by an inner layer of armor wires 3108. The inner layer 3108 is surrounded by an outer layer of armor wires 3110. As a non-limiting example the layers 3108, 3110 are contra helically wound with each other. An interstitial void created in the outer layer 3110 (e.g. between adjacent ones of the armor wires of the outer layer 3110) is filled with a polymer as part of a jacket 3112. As a non-limiting example, at least a portion of the jacket 3112 is formed from a fiber reinforced polymer. In the embodiment shown, the jacket 3112 encapsulates at least each of the layers 3108, 3110.

In the embodiment shown, an outer circumferential portion 3113 of the jacket 3112 (e.g. 1 to 15 millimeters) is formed from polymeric material without reinforcement fibers disposed therein to provide a smooth outer surface 3114. As a non-limiting example, the outer circumferential portion 3113 may be formed from virgin polymeric material or polymer materials amended with other additives to minimize a coefficient of friction. As a further non-limiting example, a non-fiber reinforced material is disposed on the jacket 3112 and chemically bonded thereto.

Figure 32:
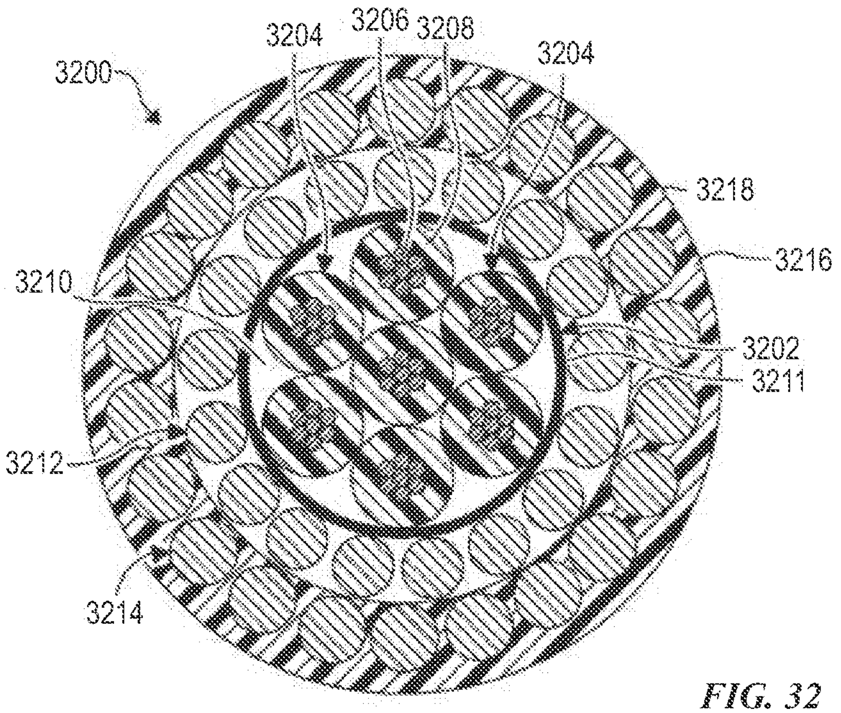
FIG. 32 illustrates a radial cross-sectional view of another embodiment of a wireline cable.

FIG. 32 illustrates a torque balanced cable 3200 for downhole operations according to another embodiment of the present disclosure similar to the cable 2400, except as described below. As shown, the cable 3200 includes a core 3202 having a plurality of conductors 3204. As a non-limiting example, each of the conductors 3204 is formed from a plurality of conductive strands 3206 with an insulator 3208 disposed therearound. In certain embodiments an interstitial void 3210 formed between adjacent insulators 3208 is filled with semi-conductive or non-conductive filler (e.g. filler strands, insulator filler). As a further non-limiting example, a layer of insulative material 3211 (e.g. polymer) is circumferentially disposed around the core 3202.

The core 3202 and the insulative material 3211 are surrounded by an inner layer of armor wires 3212 which is surrounded by an outer layer of armor wires 3214. A polymer jacket 3216 is circumferentially disposed (e.g. pressure extruded) on to the outer layer 3214 to fill an interstitial void between the members of the outer layer 3214. As a non-limiting example, that jacket 3216 includes a substantially smooth outer surface 3218 to minimize a friction coefficient thereof. As shown, the jacket 3216 is applied only on the outer layer 3214 and does not abut the core 3202 or the layer of insulative material 3211. In certain embodiments, the jacket 3216 is not chemically or physically bonded to the members of the outer layer 3214. As shown in FIG. 21, the inner armor layer of armor wirers 3212 are separated from the outer layer of armor wirers 3214, and the interstitial spaces between the armor wirers of the outer armor wires 3214 are substantially filed with a polymer.

Figure 33:
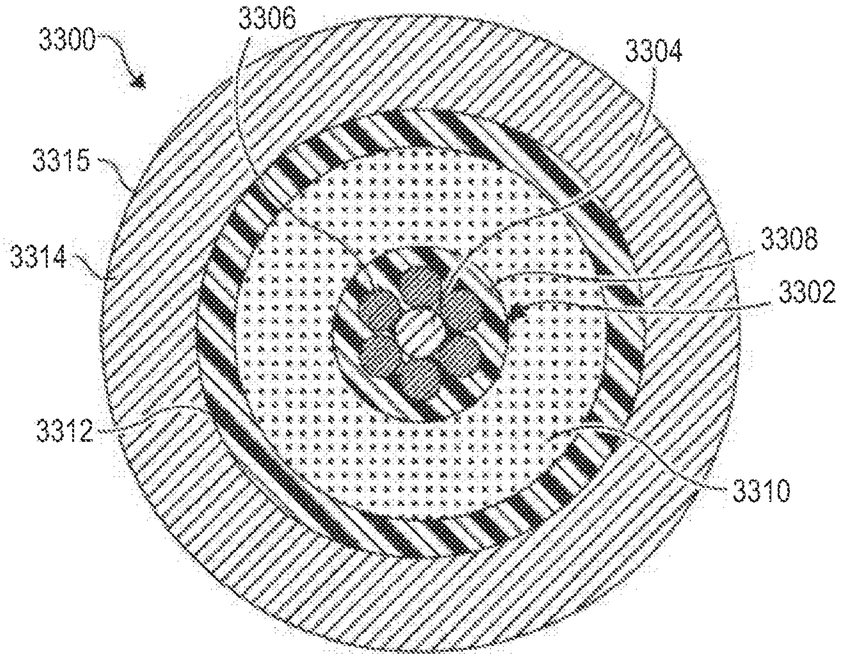
FIG. 33 illustrates a radial cross-sectional view of another embodiment of a wireline cable.

FIG. 33 illustrates a torque balanced cable 3300 for downhole operations according to another embodiment of the present disclosure. As shown, the cable 3300 includes a core 3302 having an optical fiber 3304 centrally disposed therein. A plurality of conductive strands 3306 are disposed around the optical fiber 3304 and embedded in an insulator 3308. The core 3302 may comprise more than one optical fiber 3304 and/or conductive strands 3306 to define multiple power and telemetry paths for the cable 3300.

The core 3302 is surrounded by an inner strength member layer 3310 which is typically formed from a composite long fiber reinforced material such as a UN-curable or thermal curable epoxy or thermoplastic. As a non-limiting example, the inner armor layer 3310 is pultruded or rolltruded over the core 3302. As a further non-limiting example, a second layer (not shown) of virgin, UN-curable or thermal curable epoxy is extruded over the inner armor layer 3310 to create a more uniformly circular profile for the cable 3300.

A polymeric jacket 3312 may be extruded on top of the inner strength member layer 3310 to define a shape (e.g. round) of the cable 3300. An outer metallic tube 3314 is drawn over the jacket 3312 to complete the cable 3300. As a non-limiting example, the outer metallic tube 3314 includes a substantially smooth outer surface 3315 to minimize a friction coefficient thereof. The outer metallic tube 3314 and the inner armor layer 3310 advantageously act together or independently as strength members. Each of the inner strength member layer 3310 and the outer metallic tube 3314 are at zero lay angles, therefore, the cable 3300 is substantially torque balanced.

Figure 34:
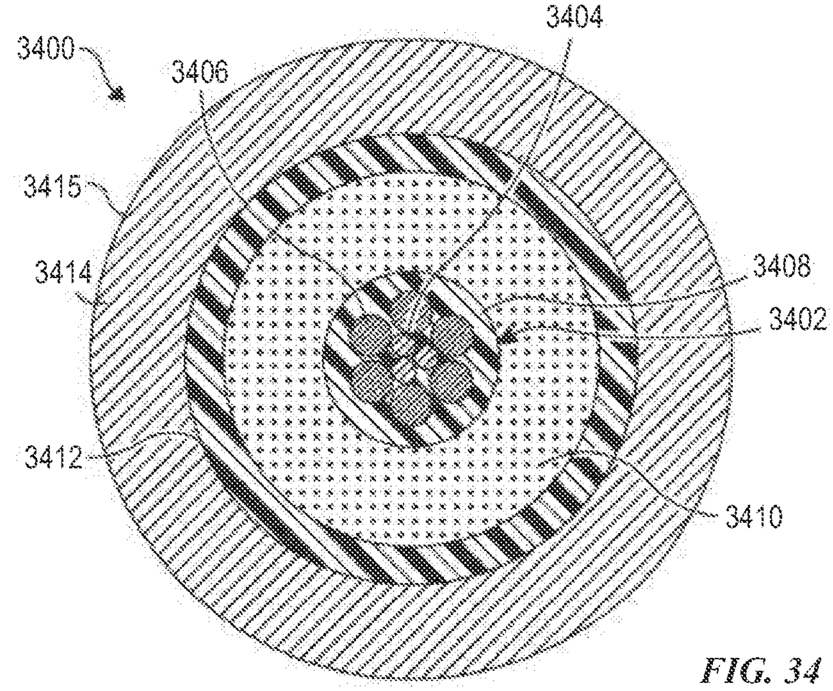
FIG. 34 illustrates a radial cross-sectional view of another embodiment of a wireline cable.

FIG. 34 illustrates a torque balanced cable 3400 for downhole operations according to another embodiment of the present disclosure similar to the cable 3300, except as described below. As shown, the cable 3400 includes a core 3402 having a plurality of optical fibers 3404 disposed therein. A plurality of conductive strands 3406 are disposed around the optical fibers 3404 and embedded in an insulator 3408. The core 3402 may comprise more than one optical fiber 3404 and/or conductive strands 3406 to define multiple power and telemetry paths for the cable 3400.

Figure 35:
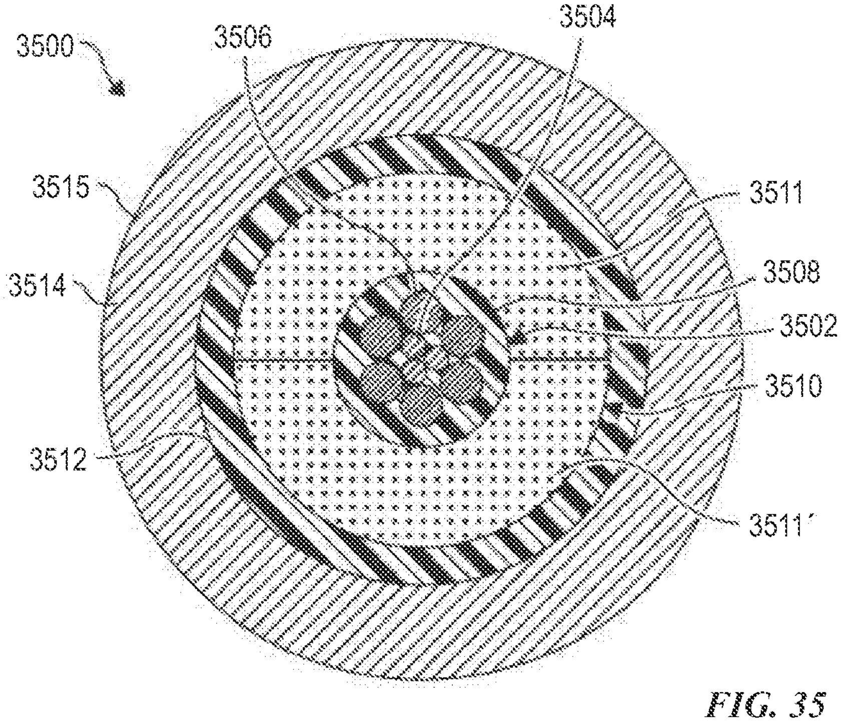
FIG. 35 illustrates a radial cross-sectional view of another embodiment of a wireline cable.

FIG. 35 illustrates a torque balanced cable 3500 for downhole operations according to another embodiment of the present disclosure similar to the cable 3300, except as described below. As shown, the cable 3500 includes a core 3502 having a plurality of optical fibers 3504 disposed therein. A plurality of conductive strands 3506 are disposed around a configuration of the optical fibers 3504 and embedded in an insulator 3508.

The core 3502 is surrounded by an inner strength member layer 3510 which is typically formed from a composite long fiber reinforced material such as a UN-curable or thermal curable epoxy or thermoplastic. As a non-limiting example, the inner armor layer 3510 is pultruded or rolltruded over the core 3502. As a further non-limiting example, the inner armor layer 3510 is formed as a pair of strength member sections 3511, 3511', each of the sections 3511, 3511' having a semi-circular shape when viewed in axial cross-section.

Figure 36:
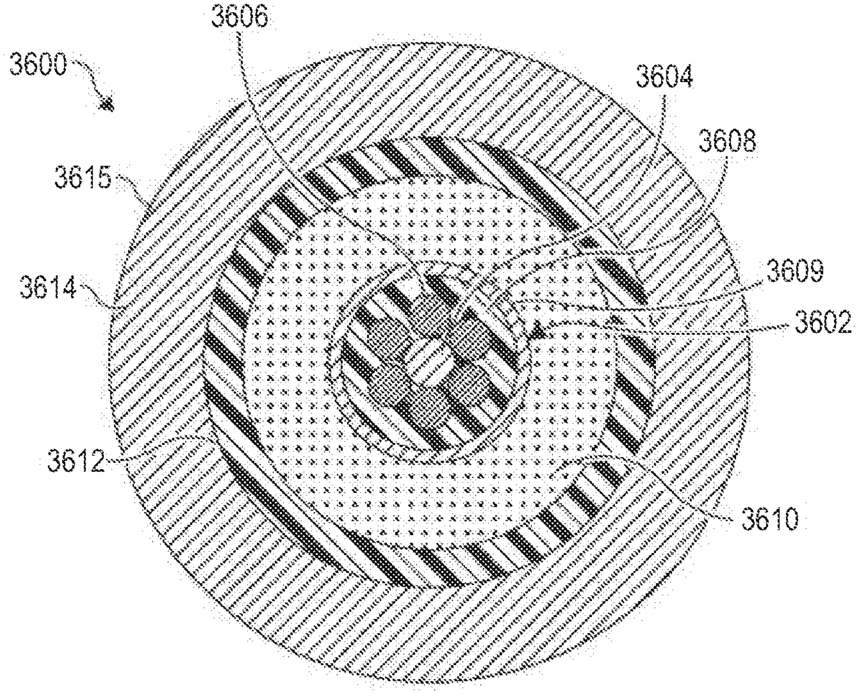
FIG. 36 illustrates a radial cross-sectional view of another embodiment of a wireline cable.

FIG. 36 illustrates a torque balanced cable 3600 for downhole operations according to another embodiment of the present disclosure similar to the cable 3300, except as described below. As shown, the cable 3600 includes a core 3602 having an optical fiber 3604 centrally disposed therein. A plurality of conductive strands 3606 are disposed around the optical fiber 3604 and embedded in an insulator 3608. The core 3602 is surrounded by an inner metallic tube 3609 having a lay angle of substantially zero. It is understood that the inner metallic tube 3609 can have any size and thickness and may be utilized as a return path for electrical power.

Figure 37:
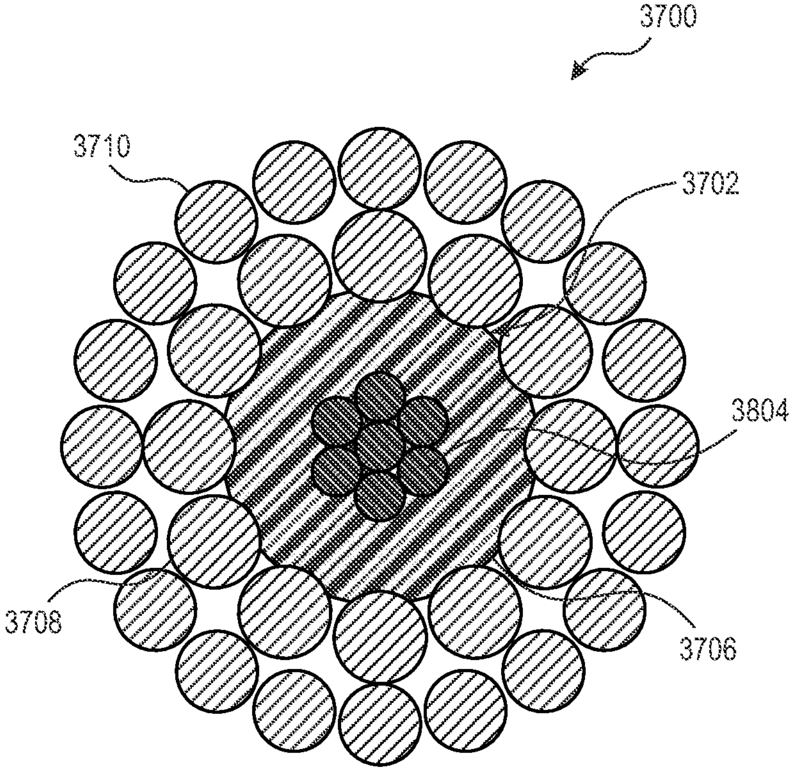
FIG. 37 illustrates a cross-sectional view of a wireline cable, in accordance with certain embodiments of the present disclosure.

FIG. 37 illustrates a cross-sectional view of a wireline cable 3700, in accordance with an example embodiment of the present disclosure. Wireline cable 3700 may include a core 3702 having a plurality of conductive strands 3704. The core 3702 may have a diameter between 0.06 and 0.30 inches. The plurality of conductive strands 3704 may be embedded in a polymeric insulator 3706. The plurality of conductive strands 3704 may be formed from copper. The plurality of conductive strands 3704 may transmit electrical power downhole.

The core 3702 may be surrounded by an inner layer of armor wires 3708. The inner layer of armor wires 3708 may be surrounded by an outer layer of armor wires 3710. The inner layer of armor wires 3708 may have a diameter between 0.02 and 0.07 inches. The outer layer of armor wires 3710 may have a diameter between 0.02 inches and 0.07 inches. The diameter of the outer layer of armor wires 3710 may be smaller than the diameter of the inner layer of armor wires 3708. For example, the diameter of the outer layer of armor wires 3710 may be at least 0.005 inches smaller than the diameter of the inner layer of armor wires 3708. The inner layer of armor wires 3708 and outer layer of armor wires 3710 may be contra-helically wound with each other. A coverage of the circumference of the outer layer of armor wires 3710 over the inner layer of armor wires 3708 may be selected to reduce and/or match a torque created by the inner layer of armor wires 3708. For example, the coverage of the circumference of the outer layer of armor wires 3710 may be at least 96%.

Figure 38:
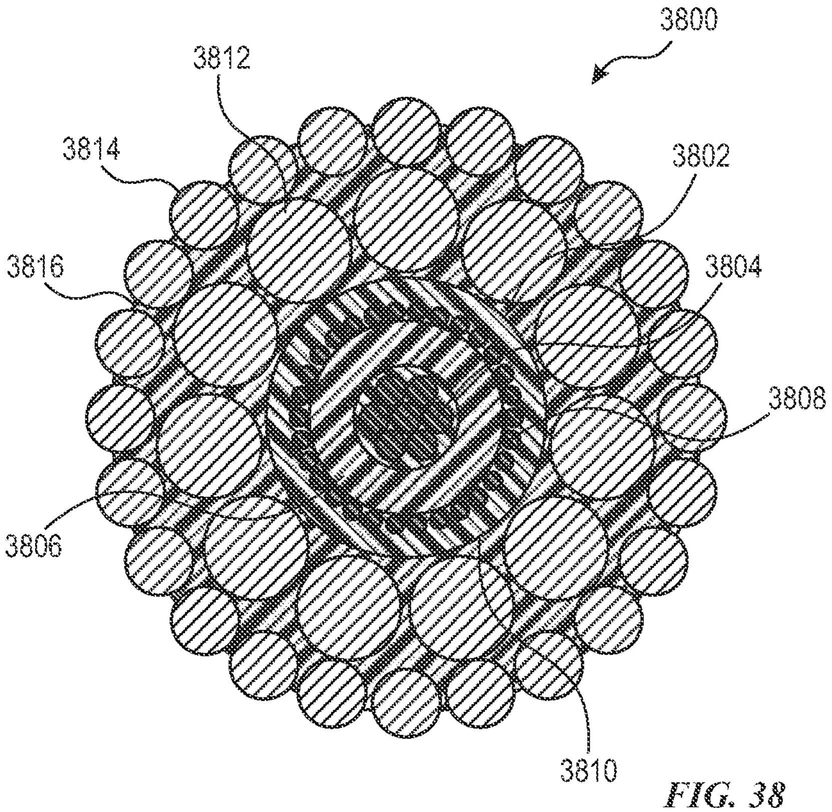
FIG. 38 illustrates a cross-sectional view of a wireline cable, in accordance with certain embodiments of the present disclosure.

FIG. 38 illustrates a cross-sectional view of a wireline cable 3800, in accordance with another embodiment of the present disclosure. Wireline cable 3800 may include a core 3802 having a plurality of conductive strands 3804. The core 3802 may have a diameter between 0.06 and 0.30 inches. The plurality of conductive strands 3804 may be embedded in a polymeric insulator 3806. The plurality of conductive strands 3804 may be formed from copper. The plurality of conductive strands 3804 may transmit electrical power downhole.

The core 3802 may include an annular array of shielding wires 3808. The array of shielding wires 3808 may be circumferentially disposed about a periphery of the core 3802. The array of shielding wires 3808 may be formed from a conductive material (e.g., copper). An annular layer of insulating material 3810 may be disposed about a circumference of the core 3802. The insulating material 3810 may be a polymeric material.

The core 3802 and the array of shielding wires 3808 may be surrounded by an inner layer of armor wires 3812. The inner layer of armor wires 3812 may be surrounded by an outer layer of armor wires 3814. The inner layer of armor wires 3812 may have a diameter between 0.02 and 0.07 inches. The outer layer of armor wires 3814 may have a diameter between 0.02 and 0.07 inches. The diameter of the outer layer of armor wires 3814 may be smaller than the diameter of the inner layer of armor wires 3812. For example, the diameter of the outer layer of armor wires 3814 may be at least 0.005 inches smaller than the diameter of the inner layer of armor wires 3812. The inner layer of armor wires 3812 and the outer layer of armor wires 3814 may be contra-helically wound with each other. A coverage of the circumference of the outer layer of armor wires 3814 over the inner layer of armor wires 3812 may be selected to reduce and/or match a torque created by the inner layer of armor wires 3812. For example, the coverage of the circumference of the outer layer of armor wires 3814 may be at least 96%.

A jacket 3816 may encapsulate the inner layer of armor wires 3812 and/or the outer layer of armor wires 3814. The jacket 3816 may be formed of a polymeric material. The jacket 3816 may be disposed about a circumference of the core 3802.

Figure 39:
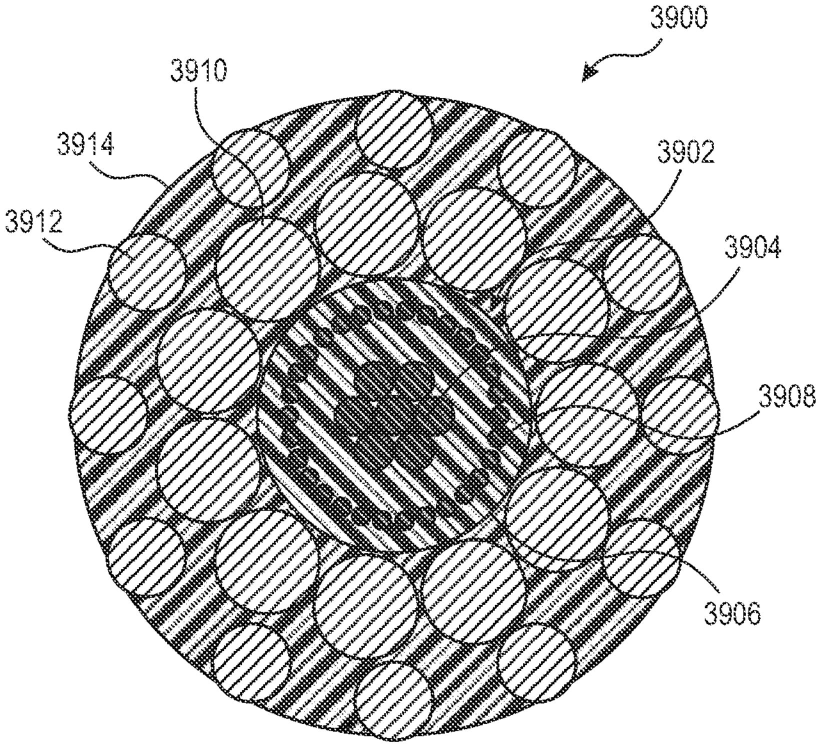
FIG. 39 illustrates a cross-sectional view of a wireline cable, in accordance with certain embodiments of the present disclosure.

FIG. 39 illustrates a cross-sectional view of a wireline cable 3900, in accordance with another embodiment of the present disclosure. Wireline cable 3900 may include a core 3902 having a plurality of conductive strands 3904. The core 3902 may have a diameter between 0.06 and 0.30 inches. The plurality of conductive strands 3904 may be embedded in a polymeric insulator 3906. The plurality of conductive strands 3904 may be formed from copper. The plurality of conductive strands 3904 may transmit electrical power downhole.

The core 3902 may include an annular array of shield wires 3908. The array of shielding wires 3908 may be circumferentially disposed about a periphery of the core 3902. The array of shielding wires 3908 may be formed from a conductive material (e.g., copper).

The core 3902 may be surrounded by an inner layer of armor wires 3910. The inner layer of armor wires 3910 may be surrounded by an outer layer of armor wires 3912. The inner layer of armor wires 3910 may have a diameter between 0.02 and 0.07 inches. The outer layer of armor wires 3912 may have a diameter between 0.02 and 0.07 inches. The diameter of the outer layer of armor wires 3912 may be equal or substantially equal to the diameter of the inner layer of armor wires 3910. For example, the diameter of the outer layer of armor wires 3912 may be within 0.0025 inches of the diameter of the inner layer of armor wires 3910. In some embodiments, the diameter of the outer layer of armor wires 3912 may be smaller than a diameter of the inner layer of armor wires 3910. For example, the diameter of the outer layer of armor wires 3912 may be at least 0.005 inches smaller than the diameter of the inner layer of armor wires 3910. The inner layer of armor wires 3910 and outer layer of armor wires 3912 may be contra-helically wound with each other.

A coverage of the circumference of the outer layer of armor wires 3912 over the inner layer of armor wires 3910 may be selected to reduce and/or match a torque created by the inner layer of armor wires 3910. For example, the coverage of the circumference of the outer layer of armor wires 3912 may be between 50% and 96%, inclusive of both ends of the range. A coverage of the circumference of the outer layer of armor wires 3912 over the inner layer of armor wires 3910 may be selected to provide a greater torque on the outer layer of armor wires 3912 than a torque on the inner layer of armor wires 3910.

A jacket 3914 may encapsulate the inner layer of armor wires 3910 and/or the outer layer of armor wires 3912. The jacket 3914 may be formed of a polymeric material. The jacket 3914 may be disposed about a circumference of the core 3902.

The polymeric materials useful in the wireline cables of the present disclosure may include, by nonlimiting example, polyolefins (such as EPC or polypropylene), other polyolefins, polyaryletherether ketone (PEEK), polyaryl ether ketone (PEK), polyphenylene sulfide (PPS), modified polyphenylene sulfide, polymers of ethylene-tetrafluoroethylene (ETFE), polymers of poly(1,4-phenylene), polytetrafluoroethylene (PTFE), perfluoroalkoxy (PFA) polymers, fluorinated ethylene propylene (FEP) polymers, polytetrafluoroethylene-perfluoromethylvinylether (MFA) polymers, Parmax®, any other fluoropolymer, and any mixtures thereof.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A wireline cable, comprising:

an electrically conductive cable core for transmitting electrical power, wherein the electrically conductive cable core comprises at least one conductor and a polymeric insulator, a soft polymer layer, or both;

an inner layer of a plurality of first armor wires surrounding the cable core;

an outer layer of a plurality of second armor wires surrounding the inner layer, wherein a diameter of the outer layer of the plurality of second armor wires is smaller than a diameter of the inner layer of the plurality of first armor wires;

wherein a coverage of the outer layer of the plurality of second armor wires over the inner layer of the plurality of first armor wires is between 50 percent and 88 percent;

wherein a portion of the plurality of the first armor wires are at least partially imbedded into a portion of the electrically conductive cable core, at least an extruded polymer layer is disposed about the inner layer and the outer layer and fills at least a portion of spaces between a plurality of armor wires in at least one of the inner layer and the outer layer, wherein the extruded polymer layer is a thermoplastic; and wherein the extruded polymer layer fills at least a portion of the spaces between the plurality of armor wires in the inner layer and the outer layer such that the extruded polymer layer is in contact with and bonded directly to the cable core, and wherein a coefficient of friction of the extruded polymer layer is lower than a coefficient of friction of the polymeric insulator, the soft polymer layer, or both in the cable core.

2. The wireline cable of claim 1, wherein:

the diameter of the inner layer of the plurality of first armor wires is between 0.02 and 0.07 inches, the diameter of the outer layer of the plurality of second armor wires is between 0.02 inches and 0.07 inches, and the diameter of the outer layer of the plurality of second armor wires is at least 0.005 inches smaller than the diameter of the inner layer of the plurality of first armor wires.

3. The wireline cable of claim 1, wherein the coverage of the outer layer of the plurality of second armor wires over the inner layer of the plurality of first armor wires is selected to match a torque on the outer layer of the plurality of second armor wires with a torque on the inner layer of the plurality of second armor wires.

4. The wireline cable of claim 1, wherein the thermoplastic is selected from a group consisting of: thermoplastic vulcanizates, fluoro thermoplastic vulcanizates, modified Poly-ether-ether-ketone; ethylene-tetrafluoroethylene, and other thermoplastic fluoropolymers.

5. The wireline cable of claim 1, wherein a first portion of the extruded polymer layer forms a smooth outer jacket, and wherein the smooth outer jacket is connected with a second portion of the extruded polymer that fills at least a portion of spaces between a plurality of armor wires in at least one of the inner layer and the outer layer.

6. The wireline cable of claim 5, wherein the smooth outer jacket, the second portion of the extruded polymer, and at least a portion of the electrically conductive cable core are at least partially bonded.

7. The wireline cable of claim 1, wherein the extruded polymer layer fills at least a portion of the spaces between the plurality of armor wires in the inner layer and the outer layer such that the extruded polymer layer is in contact with and bonded directly to the cable core.

8. The wireline cable of claim 1, wherein an outer circumferential portion of the extruded polymer layer is free from reinforcement fibers.

9. The wireline cable of claim 1, wherein an outer circumferential portion of the extruded polymer layer is free from reinforcement fibers.

10. The wireline cable of claim 1, wherein the coverage of the outer layer of the plurality of second armor wires over the inner layer of the plurality of first armor wires is selected to provide a torque on the outer layer of the plurality of second armor wires greater than a torque on the inner layer of the plurality of first armor wires.

11. The wireline cable of claim 1, wherein a number of armor wires in the outer layer of the plurality of second armor wires is greater than a number of armor wires in the inner layer of the plurality of first armor wires.

12. A wireline cable, comprising:

an electrically conductive cable core for transmitting electrical power, wherein the electrically conductive cable core comprises a polymeric insulator, a soft polymer layer, or both;

an inner layer of a plurality of first armor wires surrounding the cable core, wherein an extruded layer of polymer is disposed over the inner layer, and wherein a portion of spaces between the first armor wires of the inner layer are filled with the extruded layer of polymer; wherein the extruded layer of polymer is a thermoplastic;

wherein the extruded layer of polymer fills at least a portion of the spaces between the plurality of armor wires in the inner layer and the cable core such that the extruded layer of polymer is in contact with and bonded directly to the cable core, and wherein a coefficient of friction of the extruded layer of polymer is lower than a coefficient of friction of the polymeric insulator, the soft polymer layer, or both in the cable core;

an outer layer of a plurality of second armor wires surrounding the inner layer, wherein a diameter of the outer layer of the plurality of second armor wires is smaller than a diameter of the inner layer of the plurality of first armor wires, and wherein a coverage of the outer layer of the plurality of second armor wires over the inner layer of the plurality of first armor wires is between 50 and 88 percent; and a jacket disposed about the outer layer of the plurality of second armor wires.

13. The wireline cable of claim 12, wherein the coverage of the outer layer of the plurality of second armor wires over the inner layer of the plurality of first armor wires is selected to provide a torque on the outer layer of the plurality of second armor wires greater than a torque on the inner layer of the plurality of first armor wires.

14. The wireline cable of claim 12, wherein:

a diameter of the inner layer of the plurality of first armor wires is between 0.02 and 0.07 inches;

a diameter of the outer layer of the plurality of second armor wires is between 0.02 and 0.07 inches, and a diameter of the outer layer of the plurality of second armor wires is at least 0.005 inches smaller than a diameter of the inner layer of the plurality of first armor wires.

15. The wireline cable of claim 12, wherein a number of armor wires in the outer layer of the plurality of second armor wires is greater than a number of armor wires in the inner layer of the plurality of first armor wires.

16. A method for use of a wireline cable, comprising:

providing the wireline cable, the wireline cable comprising:

an electrically conductive cable core for transmitting electrical power, wherein the electrically conductive cable core comprises a polymeric insulator, a soft polymer layer, or both;

an inner layer of a plurality of first armor wires surrounding the cable core, wherein an extruded layer of polymer is disposed over the inner layer, wherein the extruded polymer is a thermoplastic, and wherein a portion of spaces between the first armor wires of the inner layer are filled with the extruded polymer;

an outer layer of a plurality of second armor wires surrounding the inner layer, wherein a diameter of the outer layer of the plurality of second armor wires is smaller than a diameter of the inner layer of the plurality of first armor wires, wherein a coverage of the outer layer of the plurality of second armor wires over the inner layer of the plurality of first armor wires is between 50 percent and 88 percent, wherein a jacket is disposed about the outer layer of the plurality of second armor wires, and wherein the jacket is bonded with at least a portion of the extruded layer of polymer;

wherein the extruded layer of polymer fills at least a portion of the spaces between the plurality of armor wires in the inner layer and the outer layer such that the extruded layer of polymer is in contact with and bonded directly to the cable core, and wherein a coefficient of friction of the extruded layer of polymer is lower than a coefficient of friction of the polymeric insulator, the soft polymer layer, or both in the cable core;

attaching a tractor to the wireline cable; and introducing the tractor and the wireline cable into a wellbore.

17. The method of claim 16, wherein the diameter of the outer layer of the plurality of second armor wires is at least 0.005 inches smaller than the diameter of the inner layer of the plurality of first armor wires.

18. The wireline cable of claim 16, wherein a number of armor wires in the outer layer of the plurality of second armor wires is greater than a number of armor wires in the inner layer of the plurality of first armor wires.

* * * * *